US008762328B2

(12) United States Patent
McCabe et al.

(10) Patent No.: US 8,762,328 B2
(45) Date of Patent: Jun. 24, 2014

(54) FLEXIBLE REMOTE DATA MIRRORING

(75) Inventors: Ron McCabe, Salt Lake City, UT (US); Robert Church, Portland, OR (US); Tracy Camp, Portland, OR (US); Stuart W. Card, Newport, NY (US); David J. Schroeder, Whitesboro, NY (US)

(73) Assignee: Intellectual Ventures II LLC, Wilmington, DE (US)

( * ) Notice: Subject to any disclaimer, the term of this patent is extended or adjusted under 35 U.S.C. 154(b) by 0 days.

(21) Appl. No.: 12/612,629

(22) Filed: Nov. 4, 2009

(65) Prior Publication Data

US 2010/0049798 A1     Feb. 25, 2010

Related U.S. Application Data

(63) Continuation of application No. 09/438,184, filed on Nov. 11, 1999, now abandoned.

(51) Int. Cl.
*G06F 17/00*     (2006.01)
*G06F 15/173*    (2006.01)

(52) U.S. Cl.
USPC ............................. 707/610; 707/655; 709/223

(58) Field of Classification Search
USPC .............. 707/610, 617, 624, 625, 655; 714/6; 709/223
See application file for complete search history.

(56) References Cited

U.S. PATENT DOCUMENTS

| | | | |
|---|---|---|---|
| 4,045,781 A | 8/1977 | Levy et al. | |
| 4,347,563 A | 8/1982 | Paredes et al. | |
| 4,351,023 A | 9/1982 | Richer | |
| 4,507,751 A | 3/1985 | Gawlick et al. | |
| 4,710,870 A | 12/1987 | Blackwell et al. | |
| 4,751,702 A | 6/1988 | Beier et al. | |
| 4,755,928 A | 7/1988 | Johnson et al. | |
| 4,819,159 A | 4/1989 | Shipley et al. | |
| 4,958,270 A | 9/1990 | McLaughlin et al. | |
| 4,959,768 A | 9/1990 | Gerhart | |
| 4,982,324 A | 1/1991 | McConaughy et al. | |
| 5,051,887 A | 9/1991 | Berger et al. | |
| 5,060,185 A | 10/1991 | Naito et al. | |

(Continued)

FOREIGN PATENT DOCUMENTS

| | | |
|---|---|---|
| EP | 1193962 | 4/2002 |
| TW | 454120 | 9/2001 |

(Continued)

OTHER PUBLICATIONS

"Double-Take; Meeting the New Requirements for Enterprise Data Protection", NSI Software, 1997, pp. 1-16.

(Continued)

*Primary Examiner* — Aaron Strange
(74) *Attorney, Agent, or Firm* — Perkins Coie LLP

(57) ABSTRACT

Methods, systems, and configured storage media are provided for flexible data mirroring. In particular, the invention provides many-to-one data mirroring, including mirroring from local servers running the same or different operating systems and/or file systems at two or more geographically dispersed locations. The invention also provides one-to-many data mirroring, mirroring with or without a dedicated private telecommunications link, and mirroring with or without a dedicated server or another server at the destination(s) to assist the remote mirroring unit(s). In addition, the invention provides flexibility by permitting the use of various combinations of one or more external storage units and/or RAID units to hold mirrored data. Spoofing, SCSI and other bus emulations, and further tools and techniques are used in various embodiments of the invention.

35 Claims, 7 Drawing Sheets

(56) References Cited

U.S. PATENT DOCUMENTS

| | | | |
|---|---|---|---|
| 5,133,065 | A | 7/1992 | Cheffetz et al. |
| 5,136,707 | A | 8/1992 | Block et al. |
| 5,146,605 | A | 9/1992 | Beukema et al. |
| 5,155,845 | A | 10/1992 | Beal et al. |
| 5,197,148 | A | 3/1993 | Blount et al. |
| 5,222,217 | A | 6/1993 | Blount et al. |
| 5,257,384 | A | 10/1993 | Farrand et al. |
| 5,276,860 | A | 1/1994 | Fortier et al. |
| 5,444,849 | A | 8/1995 | Farrand et al. |
| 5,446,871 | A | 8/1995 | Shomler et al. |
| 5,454,099 | A | 9/1995 | Myers et al. |
| 5,455,932 | A | 10/1995 | Major et al. |
| 5,537,533 | A | 7/1996 | Staheli et al. |
| 5,544,347 | A | 8/1996 | Yanai et al. |
| 5,574,950 | A | 11/1996 | Hathorn et al. |
| 5,592,618 | A | 1/1997 | Micka et al. |
| 5,604,487 | A | 2/1997 | Frymier |
| 5,633,999 | A | 5/1997 | Clowes et al. |
| 5,668,986 | A | 9/1997 | Nilsen et al. |
| 5,734,818 | A | 3/1998 | Kern et al. |
| 5,742,792 | A | 4/1998 | Yanai et al. |
| 5,745,748 | A | 4/1998 | Ahmad et al. |
| 5,748,870 | A | 5/1998 | Tims et al. |
| 5,787,459 | A | 7/1998 | Stallmo et al. |
| 5,812,748 | A | 9/1998 | Ohran et al. |
| 5,835,953 | A | 11/1998 | Ohran |
| 5,845,295 | A | 12/1998 | Houseman et al. |
| 5,857,208 | A | 1/1999 | Ofek |
| 5,870,537 | A | 2/1999 | Kern et al. |
| 5,889,935 | A | 3/1999 | Ofek et al. |
| 5,901,327 | A | 5/1999 | Ofek |
| 5,933,653 | A | 8/1999 | Ofek |
| 5,946,320 | A | 8/1999 | Decker |
| 5,987,544 | A | 11/1999 | Bannon et al. |
| 6,035,412 | A | 3/2000 | Tamer et al. |
| 6,052,797 | A | 4/2000 | Ofek et al. |
| 6,058,106 | A | 5/2000 | Cudak et al. |
| 6,065,018 | A | 5/2000 | Beier et al. |
| 6,101,497 | A | 8/2000 | Ofek |
| 6,158,019 | A | 12/2000 | Squibb |
| 6,167,494 | A | 12/2000 | Cheston et al. |
| 6,209,002 | B1 | 3/2001 | Gagne et al. |
| 6,237,008 | B1 | 5/2001 | Beal et al. |
| 6,311,193 | B1 | 10/2001 | Sekido |
| 6,324,654 | B1 | 11/2001 | Wahl et al. |
| 6,385,683 | B1 | 5/2002 | DeKoning et al. |
| 6,397,308 | B1 | 5/2002 | Ofek et al. |
| 6,405,337 | B1 | 6/2002 | Grohn et al. |
| 6,438,619 | B1 | 8/2002 | Coman |
| 6,453,325 | B1 | 9/2002 | Cabrera et al. |
| 6,487,561 | B1 | 11/2002 | Ofek et al. |
| 6,571,312 | B1 | 5/2003 | Sugai et al. |
| 6,574,709 | B1 | 6/2003 | Skazinski et al. |
| 6,578,120 | B1 | 6/2003 | Stanley et al. |
| 6,717,943 | B1 | 4/2004 | Schwering |
| 6,718,347 | B1 | 4/2004 | Wilson |
| 7,107,395 | B1 | 9/2006 | Ofek et al. |
| 7,203,732 | B2 | 4/2007 | McCabe et al. |
| 7,941,501 | B2 | 5/2011 | McCabe et al. |
| 2002/0035667 | A1 | 3/2002 | Bruning, III et al. |
| 2002/0159087 | A1 | 10/2002 | Yoshida et al. |
| 2002/0199058 | A1 | 12/2002 | Ofek |
| 2003/0105845 | A1 | 6/2003 | Leermakers |
| 2004/0233910 | A1 | 11/2004 | Chen et al. |
| 2005/0027892 | A1 | 2/2005 | McCabe et al. |
| 2009/0313389 | A1 | 12/2009 | McCabe et al. |

FOREIGN PATENT DOCUMENTS

| | | |
|---|---|---|
| WO | 9400816 A1 | 1/1994 |
| WO | WO-9425919 | 11/1994 |
| WO | WO-9642019 | 12/1996 |
| WO | WO-01-35244 | 5/2001 |

OTHER PUBLICATIONS

"EN-8800 SCSI Disk Array Controller", no later than Aug. 16, 1999, pp. 1-2.
"FrameRunner", StorageTek, Mar. 16, 1999, pp. 1-5.
"FreeBSD; What is FreeBSD", FreeBSD Inc., 1995-1999, pp. 1-2.
"High-Speed Connectivity Between SCSI-Based Systems and Peripherals", General Signal Networks, no later than Aug. 16, 1999, pp. 1-2.
"Nonstop Networks; Company Profile", no later than Apr. 8, 1999, pp. 1-14.
"Nonstop Networks; SFT III vs Mirroring Utilities", Nonstop Networks Limited, 1991-1996, pp. 1-6.
"Forgiving Network Faults", NetworkWorld, 1995, pp. 1-3.
"Nonstop Networks Limited—Press Release", Mar. 4, 1996, pp. 1-2.
"Nonstop Networks Ltd.: No*Stop Network", PC Magazine, May 14, 1996, pp. 1-5.
"The Official SCSI FAQ", Editor Gary Field, Jul. 27, 1999, pp. 1-99.
"QLA1040 Ultra Wide", Qlogic Corporation, Jul. 29, 1997, pp. 1-11.
"Question: Is it possible for two computers to access the same SCSI disks?", no later than Jul. 27, 1999, pp. 1-2.
"Raid Defined", Microsynergy, 1997-1999, pp. 1-8.
"Raid Lite", ANDATACO, 1994-1996, pp. 1-2.
"Remote Shadow", Mar. 23, 1999, pp. 1-3.
"USB Info: Frequently Asked Questions", no later than Oct. 20, 1999, pp. 1-2.
"Technology; Fibre Channel Overview", no later than Oct. 20, 1999, p. 1.
"Storage Area Network-Based Backup—Why Buy Now?", R. Gray and P. Mason, International Data Corporation, 1999, pp. 1-12.
"Ultra SCSI Family Comparison and tech specs", Jul. 16, 1999, pp. 1-3.
"Volume Shadowing for Open VMS", Nov. 1996, pp. 1-14.
"Write-back cache", ZDNET, Nov. 1996, p. 1.
PCT Search Report, Jul. 19, 2000.
"Proposals Seek to Move SANs Off Fibre Channel", Tech Web, May 25, 2000.
United States Patent and Trademark Office, Non-Final Office Action, U.S. Appl. No. 12/544,979, mailed Dec. 24, 2012, 29 pages.
United States Patent and Trademark Office, Final Office Action, U.S. Appl. No. 12/544,979, mailed Jul. 3, 2013, 29 pages.
Veritas Software Corportion: "Veritas Volume Manager—Getting Started Guide—Release 3.0.1" Internet Citation, [Online] May 1999, XP002180470 Retrieved from the Internet : URL:ftp://support/veritas.com/pub/support/products/VolumeManager—UNIX/vm301 gsg 236740.pdf> [retrieved on Oct. 18, 2001].
United States Patent and Trademark Office, Non-Final Office Action, U.S. Appl. No. 12/544,979, mailed Oct. 19, 2010, 23 pages.
United States Patent and Trademark Office, Final Office Action, U.S. Appl. No. 12/544,979, mailed Jun. 13, 2011, 25 pages.
European Patent Office, Supplementary European Search Report, EP Patent Application 00923070.7, mailed Sep. 8, 2006, 6 pages.
United States Patent and Trademark Office, Non-Final Office Action, U.S. Appl. No. 12/544,979, mailed Nov, 5, 2013, 29 pages.
United States Patent and Trademark Office, Non-Final Office Action, U.S. Appl. No. 11/688,222, mailed Apr. 21, 2008, 9 pages.
United States Patent and Trademark Office, Non-Final Office Action, U.S. Appl. No. 11/688,222, mailed Jun. 11, 2010, 9 pages.
United States Patent and Trademark Office, Notice of Allowance, U.S. Appl. No. 11/688,222, mailed Jan. 3, 2011, 4 pages.
United States Patent and Trademark Office, Non-Final Office Action, U.S. Appl. No. 10/926,539, mailed Feb. 20, 2009, 25 pages.
United States Patent and Trademark Office, Restriction Requirement, U.S. Appl. No. 09/873,977, mailed Dec. 10, 2004, 6 pages.
United States Patent and Trademark Office, Non-Final Office Action, U.S. Appl. No. 09/873,977, mailed Jun. 25, 2005, 13 pages.
United States Patent and Trademark Office, Non-Final Office Action, U.S. Appl. No. 09/873,977, mailed Jan. 31, 2006, 12 pages.
United States Patent and Trademark Office, Final Office Action, U.S. Appl. No. 09/873,977, mailed Jul. 17, 2006, 11 pages.
United States Patent and Trademark Office, Notice of Allowance, U.S. Appl. No. 09/873,977, mailed Dec. 5, 2006, 4 pages.
United States Patent and Trademark Office, Non-Final Office Action, U.S. Appl. No. 09/438,184, mailed Sep. 4, 2002, 6 pages.

(56) References Cited

OTHER PUBLICATIONS

United States Patent and Trademark Office, Non-Final Office Action, U.S. Appl. No. 09/438,184, mailed Jan. 2, 2003, 10 pages.
United States Patent and Trademark Office, Non-Final Office Action, U.S. Appl. No. 09/438,184, mailed May 22, 2003, 12 pages.
United States Patent and Trademark Office, Final Office Action, U.S. Appl. No. 09/438,184, mailed Jan. 7, 2004, 6 pages.
United States Patent and Trademark Office, Examiner's Answer to Appeal Brief, U.S. Appl. No. 09/438,184, mailed Dec. 3, 2004, 13 pages.
United States Patent and Trademark Office, Patent Board Decision, U.S. Appl. No. 09/438,184, mailed Sep. 28, 2005, 9 pages.
United States Patent and Trademark Office, Final Office Action, U.S. Appl. No. 09/438,184, mailed Dec. 16, 2005; 11 pages.
United States Patent and Trademark Office, Non-Final Office Action, U.S. Appl. No. 09/438,184, mailed Jul. 13, 2007, 10 pages.
United States Patent and Trademark Office, Restriction Requirement, U.S. Appl. No. 09/438,184, mailed Jan. 10, 2008, 6 pages.
United States Patent and Trademark Office, Non-Final Office Action, U.S. Appl. No. 09/438,184, mailed May 2, 2008, 16 pages.
United States Patent and Trademark Office, Final Office Action, U.S. Appl. No. 09/438,184, mailed May 4, 2009, 17 pages.

FLEXIBLE REMOTE DATA MIRRORING

CROSS-REFERENCE TO RELATED APPLICATIONS

This application is a continuation of prior U.S. patent application Ser. No. 09/438,184, filed Nov. 11, 1999, which is incorporated by reference in its entirety.

FIELD OF THE INVENTION

The present invention relates to the remote mirroring of digital data from a server or other computer in order to provide better fault tolerance and/or disaster recovery, and relates more particularly to tools and techniques for increasing the flexibility of remote data mirroring by permitting its use in a wider variety of network configurations than those previously used.

TECHNICAL BACKGROUND OF THE INVENTION

U.S. Pat. No. 5,537,533 describes tools and techniques for remote mirroring of digital data from a primary network server to a remote network server. A system according to that patent includes a primary data transfer unit with a primary server interface and a primary link interface, and a remote data transfer unit with a remote link interface and a remote server interface. The primary link interface includes a spoof packet generator capable of generating a pre-acknowledgement for the primary network server. That is, the system has a "smart buffer" which gives the primary server a pre-acknowledgement or "spoof" after mirrored data has been stored on a nonvolatile buffer in the primary link interface and before an acknowledgement arrives indicating that the mirrored data has been stored by the remote server.

MiraLink Corporation of Salt Lake City, Utah is the owner of U.S. Pat. No. 5,537,533. MiraLink has made commercially available for more than one year before the date of the present application an Off-SiteServer product (OFF-SITESERVER is a mark of MiraLink). The Off-SiteServer product includes technology to remotely mirror the disks of a Novell NetWare server to another server at a geographically remote location through a low bandwidth telecommunications link (NETWARE is a mark of Novell, Inc.).

Remote mirroring of data from a primary network server to a remote replacement network server using data mirroring is a powerful and efficient method to back up data. Remote mirroring creates a copy of data at a safe distance from the original data and does so substantially concurrently with the storage of the original data. The remotely stored data can be available almost immediately after a disaster if it was copied to a "warm" remote network server, that is, a remote server which can be up and running as the new primary server within minutes of the actual or simulated disaster.

In a typical installation, use of the Off-SiteServer product involves a pair of Off-SiteServer boxes; one is a local box and the other is a remote box. The Off-SiteServer boxes are configured with specialized hardware and with firmware and/or other software, generally as described in U.S. Pat. No. 5,537,533. A proprietary serial line connects the local NetWare server to one of these boxes. The NetWare server itself uses a Vinca card (VINCA is a mark of Vinca Corporation). This card is driven by a NetWare Loadable Module ("NLM") that intercepts disk-driver requests, and sends data down the serial line to the local Off-SiteServer box.

The local Off-SiteServer box has a 4 Gigabyte nonvolatile buffer, such as an IDE disk drive. Data is pre-acknowledged into this Off-SiteServer buffer. As far as the operating system of the local server is concerned a second "mirrored" write has occurred locally. In reality, the Off-SiteServer product has received this data from the NLM and stored it on the local buffer. The local Off-SiteServer box stores sector and track (or block level) data changes until it can safely send them to the remote Off-SiteServer box at the remote location. The buffer in the local Off-SiteServer box is also "smart" in that it stores any data above what the telecommunications link can handle locally. This data is stored in the local Off-SiteServer box until the remote Off-SiteServer box has successfully written to the remote secondary server and sent back an acknowledgement to the local (primary) Off-SiteServer box. When this acknowledgement is received the local Off-SiteServer box frees the space in the local nonvolatile buffer that is occupied by the successfully transmitted piece of sector/track/block data.

The Off-SiteServer product uses a V.35 interface for data output at the local (primary) site. V.35 is a serial telecommunications standard that connects to a Channel Service Unit/Data Service Unit ("CSU/DSU"), which in turn interfaces with the telecommunications link. The remote (secondary) location has a second CSU/DSU that relays the sector/track/block information to the V.35 input interface of the remote secondary Off-SiteServer box. The secondary Off-SiteServer box outputs this sector/track/block data through the proprietary serial connection using a serial cable connected to another Vinca card in the secondary (remote) server. The remote server's data mirroring and system software then writes this sector/track/block information to the remote server's disk drive and the write is acknowledged back to the local Off-SiteServer box. This system is capable of handling about 300 megabytes of change data in an hour.

The Off-SiteServer product is intelligent enough to sense if there is a decrease or increase in bandwidth and/or if the telecommunications link has gone down. During link downtime periods, the Off-SiteServer box can store data changes from the server in the local nonvolatile smart buffer. When the link is active again, the Off-SiteServer product starts transmitting automatically. The Off-SiteServer product can change its bandwidth output on the fly as bandwidth becomes more or less available. All of the transmissions described above also incorporate standard software checksum error detection and correction, and/or hardware error correcting code ("ECC") error handling.

In case of a disk or server failure on the local (primary) NetWare server, a secondary (remote) server attached to a remote (secondary) Off-SiteServer box in the manner just described has a complete mirrored disk copy of all the data on the local (primary) server. This remote backup copy can be restored back to the local (primary) server. This secondary remote server can also stand in for the local primary server in the event of disaster. Such a secondary restoration and/or stand-in can be executed relatively quickly with a simple set of command lines.

In short, the Off-SiteServer product and other remote data mirroring technologies provide valuable fault-tolerance and disaster recovery capabilities, both to mission-critical data and in other contexts. Nonetheless, these existing approaches have unnecessarily limited flexibility.

For instance, the Off-SiteServer product requires a specific version of hardware and software from Vinca Corporation. This required version of the Vinca product does not support any operating system/file system platform other than the Novell NetWare platform. The hardware component of the necessary Vinca package also does not work with newer, faster servers and larger disk volumes.

The original Off-SiteServer product was also designed to connect one local server to one remote server. Only a single server can mirror to a remote server at a given time. Multiple servers at different locations cannot readily mirror to a single remote site. Likewise, if an enterprise has multiple local servers running different operating systems and/or file systems, each server running a separate platform must be mirrored to a matching remote server.

As explained in greater detail in discussing the present invention, there are other flexibility limitations as well. For instance, the original Off-SiteServer product requires an NLM on the local server, and it was designed to use private dedicated telecommunications links. Conventional mirroring also requires a remote server in order to keep mirrored information in a bootable format at the remote location.

Thus, it would be an advancement in the art to provide more flexible tools and techniques for remote data mirroring, in order to take advantage of both existing and new technologies.

Such improved tools and techniques are disclosed and claimed herein.

BRIEF SUMMARY OF THE INVENTION

The present invention provides tools and techniques for flexibly mirroring data. For instance, the invention permits the use of various combinations of one or more external storage units and/or RAID units to hold mirrored data. In addition, the invention provides many-to-one data mirroring, including mirroring from local servers running the same or different operating systems and/or file systems at two or more geographically dispersed locations. The invention also provides one-to-many data mirroring, mirroring with or without a dedicated private telecommunications link, and mirroring with or without a server at the destination(s) to assist the remote mirroring unit(s). Spoofing, SCSI and other bus emulations, and other tools and techniques are used in various embodiments of the invention.

Unlike some conventional mirroring approaches, the invention does not require a secondary server at the remote location in order to mirror data. A remote server may be used to test the integrity of mirrored data, or to replace a local server which becomes unavailable, but the remote server is not needed to maintain a complete copy of mirrored information in a bootable format at the remote location.

A flexible local mirroring unit mirrors a local disk volume to a remote location via a journey link, which may be part of a local area network, part of the Internet, a low bandwidth telecommunications link, or a high bandwidth dedicated telecommunications link such as a T1 link. The local mirroring unit utilizes the bandwidth efficiently using an intelligent buffer with spoofing, as described in U.S. Pat. No. 5,537,533, for instance.

The local mirroring unit is non-invasive of the host operating system. It is not necessary to install on the mirrored local host an NLM or other software designed specifically for remote data mirroring. In particular, larger host volumes than before can be mirrored without degrading performance of the mirrored host, because the load on the host CPU is not substantially increased by mirroring according to the present invention. Putting the necessary processing in the local mirroring unit instead of in the host server also increases reliability and flexibility by making it possible to reconfigure or even reboot the local mirroring unit without interfering with host server processing.

To the local host server whose data is being remotely mirrored, the local mirroring unit appears to be simply some familiar type of disk subsystem. Accordingly, standard mirroring tools and techniques can be used within the local server to direct a copy of the data to the local mirroring unit, for subsequent forwarding (unbeknownst to the local server) to a remote mirroring unit that may be tens or hundreds of miles away. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to computer systems, methods, and configured storage media for flexible data mirroring. In particular, the invention provides non-invasive mirroring, mirroring with or without a dedicated private telecommunications link, and mirroring with or without a dedicated server or another server at the destination to assist the remote mirroring unit. The invention also provides many-to-one data mirroring, including mirroring from local servers running the same or different operating systems and/or file systems at two or more geographically dispersed locations. In addition, the invention provides flexibility by permitting the use of various combinations of one or more external storage units and/or RAID units to hold mirrored data.

The invention may be embodied in methods, systems, and/or configured storage media. Unless clearly indicated otherwise, discussions of any one of the embodiment types also apply to the other embodiment types. For instance, the discussions of inventive systems will also help one understand inventive methods for configuring such systems and/or methods for sending data through such systems to have the data mirrored.

Computers and Networks Generally

Figure 1:
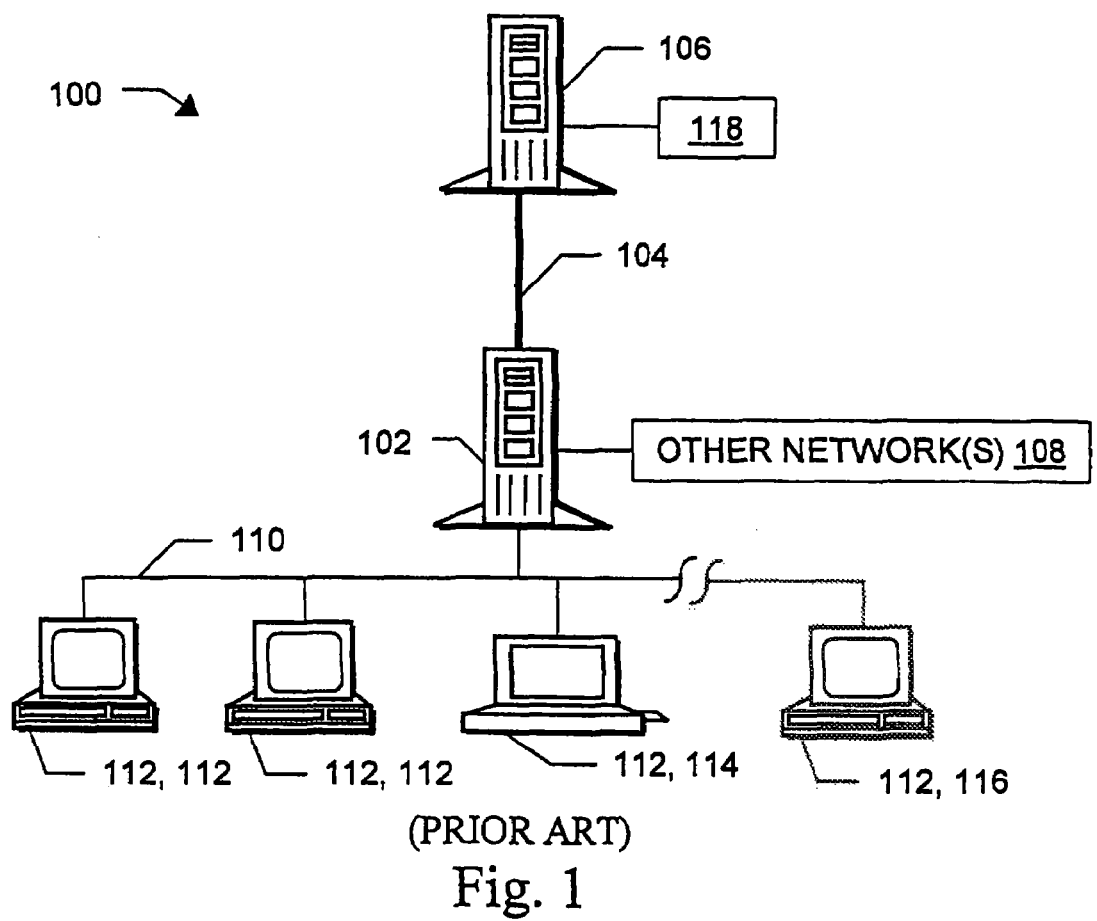
FIG. 1 is a diagram illustrating prior art mirroring in a network of computers which could also be adapted for use with the present invention.

FIG. 1 illustrates a network 100 in which a local server 102 is mirrored over a conventional route 104 to a remote server 106. The conventional route 104 is not limited to telecommunication links themselves, but also includes modems, data transfer units, and other conventional tools and techniques used to send data on such links and/or to receive data thus sent. In particular and without limitation, the conventional route 104 may include the server interfaces, link interfaces, and DTUs which are illustrated in FIG. 1 of U.S. Pat. No. 5,537,533 and discussed in that patent.

In addition, the conventional route 104 may include Small Computer System Interface ("SCSI") performance extenders or standard Storage Access Network ("SAN") connectors. Such devices require a very high bandwidth link and minimal latency. They tend to have distance limitations of perhaps ten or twenty miles because distance introduces latency. For instance, in a single mode fiber configuration the latency on a given SCSI extender might allow a distance of perhaps fifteen kilometers between the data source and destination. Using a multi-mode fiber would reduce the distance available to perhaps two-thirds of that because of latency. Such connections have little or no tolerance for delays or interruptions longer than a few fractions of a second, or at best can only gracefully handle delays of a few seconds. These same problems apply to mainframe channel extenders.

Although the network 100 as shown is configured for mirroring according to conventional tools and techniques, it is also one of the many possible networks suitable for adaptation and use according to the present invention. Such adaptation would include various steps, depending on the particular embodiment of the present invention to be used. For instance, adaptation could involve disconnecting the remote server 106 if it is no longer needed, supplementing or replacing the conventional mirroring route 104 with mirroring units linked according to the present invention, unloading mirroring NLMs or other specialty software from the local server 102, adding more local servers which will also be mirrored, and/or adding remote storage in the form of external storage volumes and/or Redundant Array of Independent Disks ("RAID") units. At a minimum, however, the adaptation normally involves the addition of at least one local mirroring unit and at least one remote mirroring unit, with the remote mirroring units capable of being linked to each other for operation according to the present invention.

Before and/or after its adaptation, the network 100 may be connectable to other networks 108, including LANs or WANs or portions of the Internet or an intranet, through a gateway or similar mechanism, thereby forming a larger network. In the illustrated network 100 the local server 102 is connected by communication links or network signal lines 110 to one or more network clients 112. Other suitable networks include multi-server networks and peer-to-peer networks. The server(s) 102 and client(s) 112 in a particular network may be uniprocessor, multiprocessor, or clustered processor machines. The server(s) 102 and client(s) 112 each include an addressable storage medium such as random access memory.

Suitable network clients 112 include, without limitation, personal computers; laptops 114, personal digital assistants, and other mobile devices; and workstations 116. The signal lines 110 may include twisted pair, coaxial, or optical fiber cables, telephone lines, satellites, microwave relays, modulated AC power lines, RF connections, a network link, a dial-up link, a portable link such as an infrared link, and/or other data transmission "wires" or communication links known to those of skill in the art. The links 110 may embody conventional or novel signals, and in particular, may embody a novel series of commands and/or data structures for mirroring data as discussed herein. The remote server 106 may store mirrored data it obtains over the conventional route 104 on an attached storage means such as an external hard disk and/or RAID subsystem 118.

Examples of Flexible Mirroring Unit Systems

Figure 2:
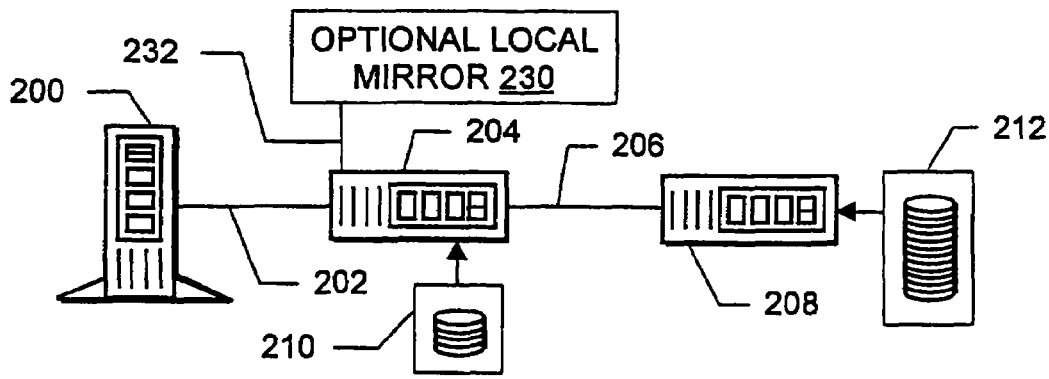
FIG. 2 is a diagram illustrating a computer system according to the invention, without a remote server, but including a remote mirroring unit having a large buffer.

FIG. 2 illustrates the present invention in systems according to the invention. Unlike previously discussed conventional approaches, systems according to this Figure do not require a remote server. A local server 200 or some other host 200 communicates over a local link 202 with a local mirroring unit 204. The local mirroring unit 204 communicates over a journey link 206 with a remote mirroring unit 208. Local mirroring units may include a spoof packet generator for pre-acknowledging data to the local server 200, and a nonvolatile data buffer 210 for holding mirrored data before it has been stored at the remote location. Remote mirroring units have a destination nonvolatile storage for mirrored data received from the local mirroring unit(s) 204 over the journey link(s) 206. The remote mirroring unit may be physically separated from a local server 200 by various distances, such as under ten miles, at least ten miles, or at least one hundred miles. These distances are mere examples; because the present invention can take full advantage of journey links(s)

206, systems according to the invention have no inherent distance limitations. Individual mirroring units are discussed in greater detail below, both in connection with illustrations of their flexibility in example systems shown in FIGS. 2 through 12, and in connection with their components and operation in general.

However, it may be helpful to note here that some embodiments of local mirroring units 204 include SCSI emulation software and/or hardware, allowing the local link 202 to be a SCSI connection through which the local mirroring unit 204 appears to the local server 200 or other host 200 as a SCSI disk or other conventional SCSI device. This may be accomplished by using within the local mirroring unit 204 a SCSI host adapter that is running in target mode instead of the more usual initiator mode. Suitable SCSI host adapters having such a target mode include at least the Adaptec 2940UW adapter, and the QLogic QLA-1040 adapter. In a similar manner, the local link 202 can be a fibre channel connection, a Universal Serial Bus ("USB") connection, a mainframe channel extender, a V.35 CSU/DSU connection, a FireWire (IEEE 1394) connection, a memory type (for instance, the AS/400 mirrors memory, not disk), an IDE bus, a PCMCIA connection, a serial connection, an Ethernet connection, a Fiber Distributed Data Interface ("FDDI") connection, or another standard bus for connecting a disk and/or a Redundant Array of Independent Disks ("RAID") subsystem to a server. Thus, conventional mirroring (in the sense of copying to another local disk) hardware and/or software can be used within the local server 200, as if the mirrored data were simply being sent to another local disk instead of being sent across the journey link 206 to a remote location.

Unlike long distance links in previously discussed conventional approaches, the journey link 206 need not be a dedicated private telecommunications link. Although such a link may still be used in some embodiments, the invention also provides mirroring units 204, 208 which communicate over a network, or a series of networks such as the Internet, using Ethernet, FDDI, V.35, or other data link protocols, the Internet Protocol (IP) or other network protocols, and/or the User Datagram Protocol (UDP), Transmission Control Protocol (TCP), or other transport protocols, without regard for the routability or non-routability of such protocols. Accordingly, the two mirroring units 204, 208 may be separated by many tens or hundreds of miles if so desired.

The journey link 206 can be fed through a conventional link 104 and a spoofing local mirroring unit 204 as the data acquisition point. However, the journey link 206 does not necessarily impose requirements of high bandwidth and low latency, which are often imposed by conventional links 104. Unlike a SAN, for instance, a system using the journey link 206 can send mirrored data from a source to a destination which is an unlimited distance away. The journey link 206 can also provide shared bandwidth, as it typically will when crossing the Internet or a wide area network. Moreover, the journey link 206 and/or the mirroring units provide inventive systems with the advantage of a relatively high tolerance for interruptions and disconnects.

The illustrated remote mirroring unit 208 has a large buffer 212. As a result, the remote mirroring unit 208 can buffer a complete volume of the local server 200 or other host 200. In some embodiments the local mirroring unit 204 also includes a large buffer. In one embodiment, for instance, the local server 200 volume and the large buffers (local and remote) can each hold up to one terabyte of data in nonvolatile storage. This buffering may be accomplished, for instance, by using the QLogic QLA-1040 adapter within the local mirroring unit 204 or the remote mirroring unit 208 to control up to one terabyte of data with no substantial modifications needed. The complete volume image of the local server 200 can therefore be stored on the buffer(s) within the mirroring unit(s).

For added data recovery ability, an optional local mirror 230 may also be created; this is generally a "full" local mirror in the sense that it is consistent and available but not necessarily entirely up-to-date. This local mirroring may be accomplished in various ways. These include, without limitation, using a second local mirroring unit 204 or a second port of a multi-ported local mirroring unit 204 to mirror data to a "remote" disk subsystem that is actually geographically close to the local host 200; forking the data within the local mirroring unit 204 below the disk emulation layer of that unit 204, thereby creating another copy which is sent to a local attached disk subsystem over a SCSI or similar bus (the first copy is sent over the journey link 206 to a remote mirroring unit); and using otherwise conventional tools and techniques with the local mirroring unit 204 to create and maintain a local mirror 230.

The mirror 230 includes a copy of the server 200 volume to permit recovery in the event of hardware or software errors. However, because the local mirror 230 is local rather than remote, it does not provide substantial protection against natural disasters, civil unrest, terrorist attacks, physical vandalism, and other geographically localized risks to the server 200. Accordingly, the local mirror 230 does not provide the same degree of data protection as remote mirroring even if the local mirror 230 includes another mirroring unit 204 or otherwise embodies the present invention. The local mirror 230 is connected to the mirroring unit 204 by a path 232 which may include a conventional link such as the path 104, or a novel link according to the present invention. Although the local mirror 230 is not explicitly shown in the other Figures, one or more local mirrors may also be used with the systems illustrated in the other Figures and with other systems according to the invention.

For instance, one approach uses Nonstop Networks Limited's technology or other technology to mirror between two servers; the local mirroring unit is used as the sole (primary) disk subsystem of the secondary server. Another approach makes all mirroring internal to the pair of mirroring units by using the local mirroring unit as the sole disk subsystem for the host 200; the local mirror 230 becomes the primary disk, and the remote mirror serves as the sole true mirror. This last is a lower assurance configuration, but it may also provide higher performance at a lower cost.

Figure 3:
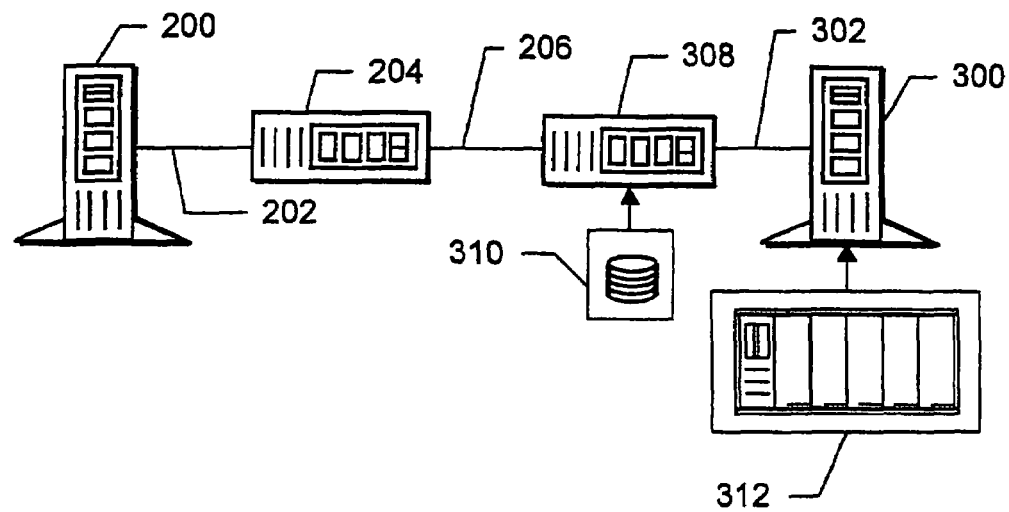
FIG. 3 is a diagram illustrating a computer system according to the invention, including a remote server with a hot-swappable RAID unit and a remote mirroring unit having a relatively small buffer.

FIG. 3 illustrates systems in which a local server 200 communicates over a local link 202 with a local mirroring unit 204. The local mirroring unit 204 communicates over a journey link 206 with a remote mirroring unit 308. Unlike the remote mirroring unit 208 which has a large nonvolatile buffer 212 capable of holding the data from an entire local server 200 volume, the remote mirroring unit 308 has only a relatively small nonvolatile buffer 310, such as a buffer 310 holding only a few gigabytes, e.g., four gigabytes.

However, systems according to FIG. 3 include a remote server 300 which has an associated nonvolatile internal or external storage. To illustrate this, FIG. 3 shows a RAID unit 312 which can be controlled at some point by the remote server 300. The RAID unit 312 is "hot-swappable," meaning that a failed drive in the RAID unit 312 can be taken out and replaced while the computer 300 is running; the file system structures and other data on the replacement drive will then be built automatically. The RAID unit 312 can be viewed in some cases as part of the server 300 or connected thereto by conventional means such as means which include dedicated mirroring software on the server 300, as indicated by the arrow in FIG. 3 from the RAID unit 312 to the server 300.

But the RAID unit 312 may also be connected to the remote mirroring unit 308 and the server 300 by a dual host connection in a configuration 1400 as discussed later below and illustrated in FIG. 14. The dual host connection allows a switchover from a first "normal mirroring" state having a passive remote server 300, a remote RAID unit 312 or other remote disk subsystem used only for mirroring, and a local mirror and/or local host 200 disk actively used to service read requests, to a second "recovery" state having an active remote server 300 which services read requests from the mirrored data on the remote RAID unit 312 or other remote disk subsystem.

In the first (normal mirroring) state, the remote mirroring unit 308 receives data from the local mirroring unit 204 using an Ethernet and/or TCP/IP connection 206, for instance. As noted in connection with FIG. 2, the local link 202 can be a SCSI bus, USB, fibre channel, or similar connection. The remote mirroring unit 308 transfers the data over a remote link 302 and remote mirroring unit 308 to the remote server 300 for subsequent storage on the hot-swappable RAID unit 312, or directly from the remote mirroring unit 308 to the RAID unit 312 if the dual host connection 1400 is being used. The remote link 302 can be a SCSI bus connection, for instance, so the remote mirroring unit 308 appears to the remote server 300 to be a SCSI disk, for instance, which is to be mirrored by the remote server 300 to another "disk," the RAID unit 312. The remote link 302 can also be a serial, Ethernet, FDDI, USB, fibre channel, or other nonproprietary connection.

The local mirroring unit 204 has a nonvolatile buffer which is similar or identical (except with respect to specific data stored in it) to the small buffer 310 of the remote mirroring unit. Data from the local server 200 is pre-acknowledged into the local mirroring unit 204 buffer. As far as the primary server 200 is concerned a second "mirrored" write has occurred locally. In reality, the local mirroring unit 204 has received this data and stored it on this local buffer. The local mirroring unit 204 stores this sector and track change data (or similar block level data) until the local mirroring unit 204 can safely send the data over the journey link 206 to the remote mirroring unit 308. The smart buffer in the local mirroring unit 204 stores any data above what the journey link 206 can handle locally. Such data is stored in the local mirroring unit 204 until the remote mirroring unit 308 has successfully written to the remote server 300 and sent back an acknowledgement to the local mirroring unit 204. When this acknowledgement is received the local mirroring unit 204 eliminates the successfully transmitted piece of sector/track/block data from the local nonvolatile buffer. Unlike conventional systems, neither server 200, 300 necessarily requires an NLM or other software designed specifically for data mirroring, as opposed to standard file system and operating system software.

Figure 4:
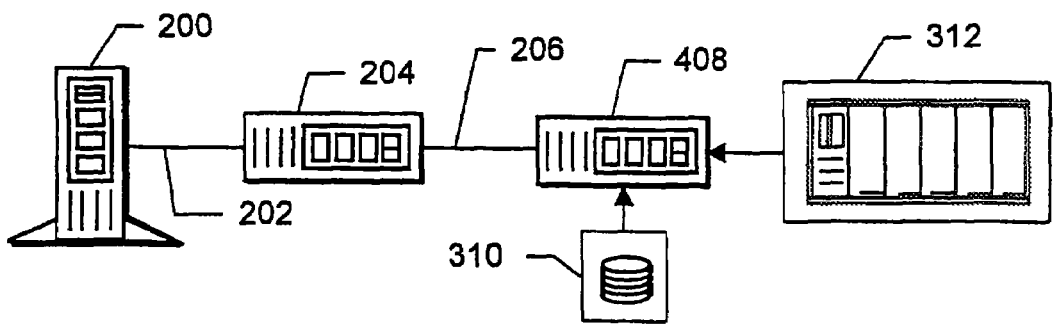
FIG. 4 is a diagram illustrating a computer system according to the invention, without a remote server, but including a remote mirroring unit having a relatively small buffer and a hot-swappable RAID unit.

FIG. 4 illustrates systems having several components which are discussed above, as indicated by the use of the same identifying numbers in the Figures. However, in the systems of FIG. 4 a remote mirroring unit 408 includes both a small nonvolatile buffer 310 and a large nonvolatile buffer; the large buffer is implemented as a hot-swappable RAID unit 312 which connects directly to the remote mirroring unit 408. The small buffer 310 is used to buffer data received over the journey link 206, allowing the data to be acknowledged back to the local mirroring unit 204, and buffering the data until it can be stored by the remote mirroring unit 408 in the large buffer 312. No remote server is needed.

Figure 5:
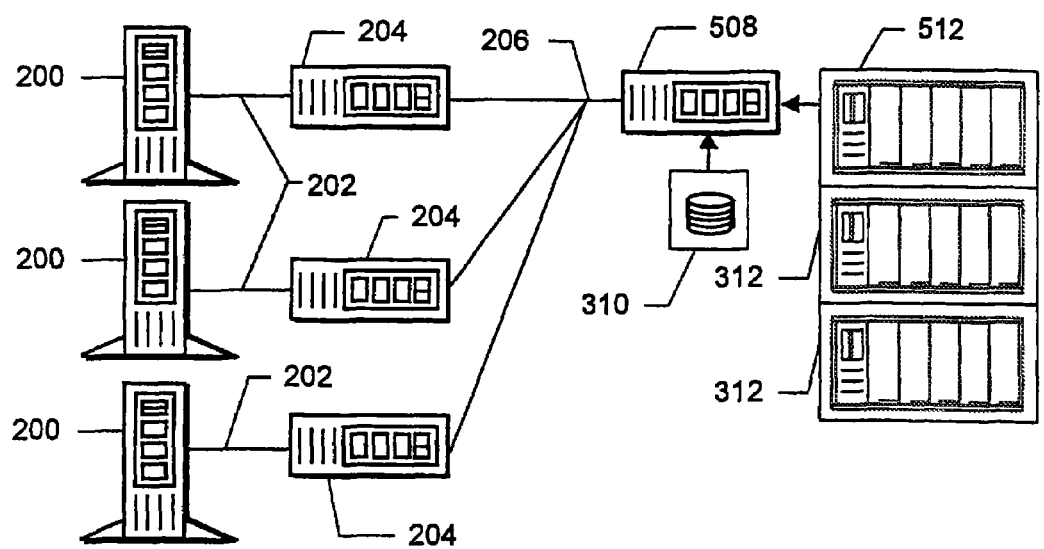
FIG. 5 is a diagram illustrating a computer system for many-to-one mirroring according to the invention, without a remote server, but including several local servers running a given platform with respective local mirroring units and a single remote mirroring unit having a relatively small buffer and several hot-swappable RAID units.

FIG. 5 illustrates systems in which two or more local servers 200 write to a remote mirroring unit 508. In this Figure and elsewhere, references to the local server 200 should be understood to also generally include hosts 200 which are not servers. That is, the invention can be used to mirror any host computer system 200 that will connect to a mirroring unit 204. Servers are a widely recognized example of suitable hosts 200, but other suitable hosts 200 include clusters, computers which are not servers, mainframes, and Storage Access Network ("SAN") or Networked Attached Storage ("NAS") data sources. The local servers 200 or other hosts 200 may be physically separated from one another by various distances, such as under ten miles, at least ten miles, or at least one hundred miles. In the systems of interest for this Figure, each local server 200 in a particular system relies on the same operating system and file system platform, but different systems according to FIG. 5 may use different platforms. For instance, each server 200 could be a Novell NetWare server in one such system, and each server 200 could be a Microsoft Windows NT server using the NT File System ("NTFS") in another such system.

Each host 200 in the system is connected by a SCSI, fibre channel, USB, serial line, or other standard storage subsystem or other peripheral connection 202 to its own local mirroring unit 204. The local mirroring units 204 are connected by journey links 206 to a single remote mirroring unit 508. The remote mirroring unit 508 has a SCSI, fibre channel, USB, or similar controller card for each of the local mirroring units 204.

The data from each local mirroring unit 204 can be transferred directly (i.e., not through a remote server) to an individual hot-swappable RAID storage unit 312 in a group 512 of RAID units, by a SCSI, fibre channel, USB, or similar connection within the remote mirroring unit 508. The RAID units 312 may be physically external to at least a portion of the remote mirroring unit 508, such as a portion containing an Ethernet card for connection to the journey link 206. However, the remote mirroring unit 508 is defined by functionality rather than packaging. In particular, the RAID units 312 are considered part of the remote mirroring unit 508 unless indicated otherwise (e.g., in discussing FIG. 14). Each RAID storage unit 312 has a remote bootable volume, and the data is written in sector/track or block fashion. The illustrated remote mirroring unit 508 also contains a small buffer 310 to allow acknowledgment and buffer of data received over the journey links 206.

Figure 6:
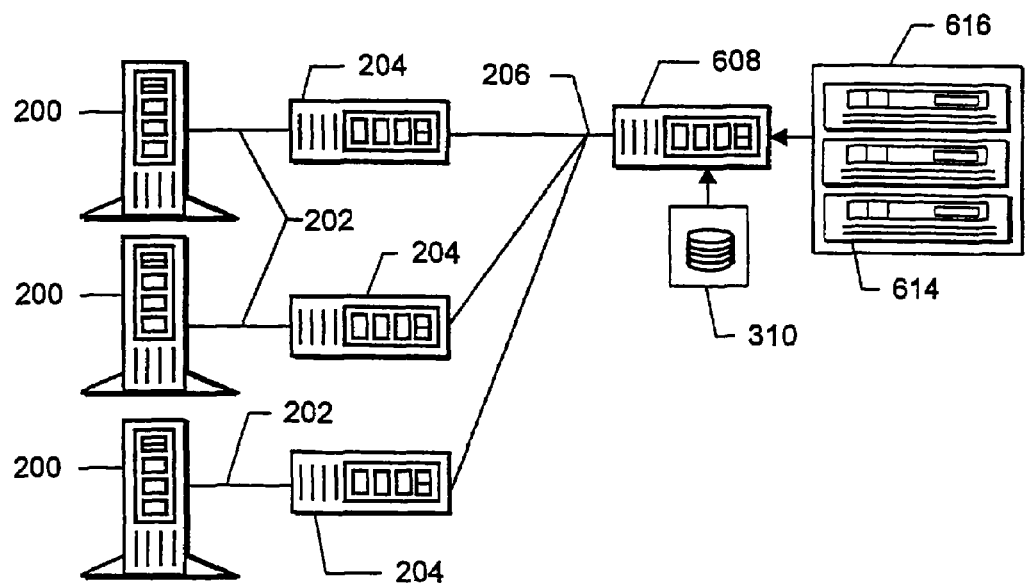
FIG. 6 is a diagram illustrating another many-to-one computer system according to the invention, without a remote server, but including several local servers running a given platform with respective local mirroring units and a single remote mirroring unit having a relatively small buffer and several individual external storage volumes.

FIG. 6 illustrates systems similar to those shown in FIG. 5, but a remote mirroring unit 608 writes to external bootable storage volumes 614 in a group 616 of such volumes. Local servers 200 running on the same platform write to "disks" which are actually local mirroring units 204, which in turn write the data to the remote mirroring unit 608. The remote mirroring unit 608 has a SCSI, fibre channel, USB, or similar controller card and a bootable storage volume 614 corresponding to each local mirroring unit 204. The data from each local mirroring unit 204 will be transferred from the remote mirroring unit 608 directly to the corresponding storage volume 614 using a SCSI bus or other data line. Each volume 614 is a remote bootable volume, and the data is written in sector/track or block fashion.

In alternative embodiments of a system generally according to FIG. 6 and in other systems as well, separate partitions may be used to hold the mirrored data of respective local servers 200, instead of holding that mirrored data in corresponding separate disks 614 (e.g., as in FIG. 6) or separate RAID units 312 (e.g., as in FIG. 5). In various many-to-one systems it may be necessary to start a process which forks itself as new connections are made and locks volume mirrors from multiple mirror attempts using an IPC or other mechanism.

Figure 7:
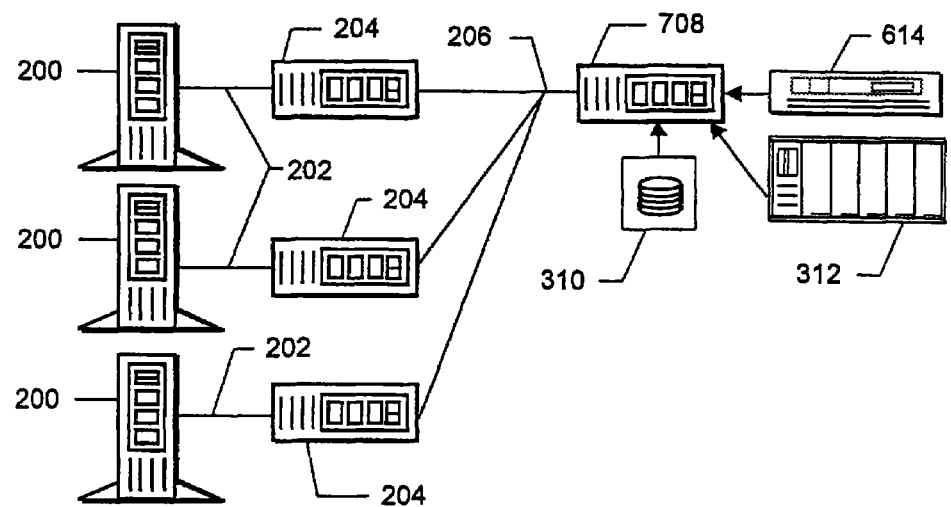
FIG. 7 is a diagram illustrating another many-to-one computer system according to the invention, without a remote server, but including several local servers running a given platform with respective local mirroring units and a single remote mirroring unit having a relatively small buffer, an external storage volume having several partitions, and a hot-swappable RAID unit likewise having several partitions.

FIG. 7 illustrates systems in which a remote mirroring unit 708 includes both an individual external storage volume 614 and a RAID unit 312. The mirrored data is stored by the remote mirroring unit 708 on both storage subsystems 312, 614, to provide extra assurance that the data will be available when needed.

FIG. 7 also illustrates systems in which two or more local mirroring units 204 write to one remote mirroring unit 708 with all mirrored data for the several local servers 200 going to one large storage volume (312 or 614 or both, in various embodiments) which is mounted directly on the remote mirroring unit 708, instead of dividing the mirrored data among several remote storage units 312 or 614 as illustrated in FIGS. 5 and 6, respectively. The volume used by the remote mirroring unit 708 has a partition for each local mirroring unit 204. Each partition provides a remote bootable "volume," and the data is written in sector/track or block fashion as usual.

In an alternative system which is also illustrated by FIG. 7, the mirrored data is divided between two or more storage units which are connected directly to the remote mirroring unit 708, with a given storage unit holding the mirrored data for a given local mirroring unit 204. However, a mixture of external disks 614 and RAID units 312 is used, unlike the systems that use RAID units only (FIG. 5) or external disks only (FIG. 6). For instance, an external disk 614 holds the data from a first local mirroring unit 204, while a RAID unit 312 holds the data from a second local mirroring unit 204. In such systems, the remote mirroring unit 708 has a SCSI, fibre channel, USB, or similar controller card corresponding to each local mirroring unit 204, and the data from each local mirroring unit 204 will be transferred directly (without a server such as server 300) to an individual external hot-swappable RAID storage unit 312 or external bootable drive 614 via a SCSI, fibre channel, USB, or similar communications line.

Figure 8:
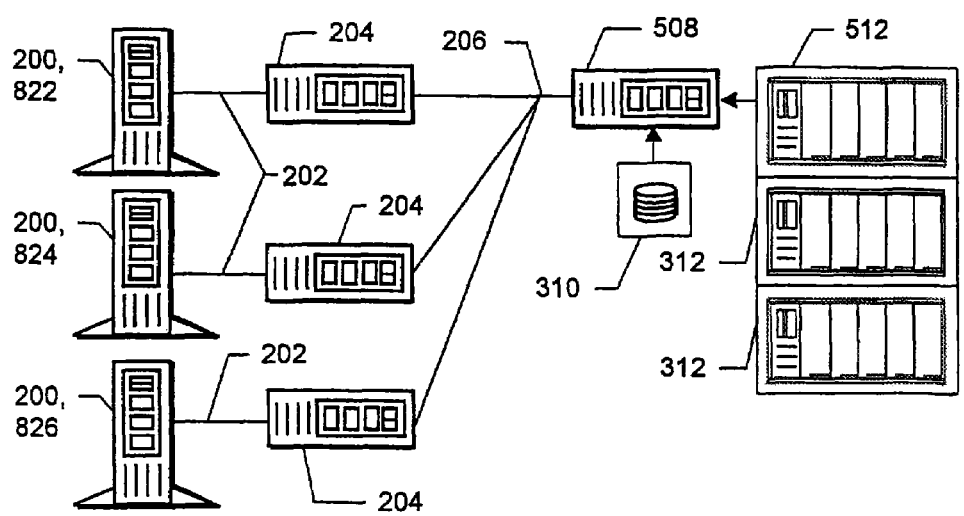
FIG. 8 is a diagram illustrating another many-to-one computer system according to the invention, without a remote server, but including several local servers running different platforms with respective local mirroring units and a single remote mirroring unit having a relatively small buffer and several hot-swappable RAID units.

FIG. 8 illustrates systems like those discussed in connection with FIG. 5. However, in the systems of FIG. 8, the local servers 200 rely on different platforms, as indicated by the presence of several numbers 822, 824, 826. Of course, systems according to this or other Figures do not necessarily have exactly three local servers 200 and corresponding local mirroring units 204; they merely have two or more pairs, with a server 200 and corresponding local mirroring unit 204 in each pair. For example, one system according to FIG. 8 includes a Novell NetWare server 822 and a Microsoft Windows NT server 824, while another system according to FIG. 8 includes two Novell NetWare servers 822, 826 and a Microsoft Windows NT server 824.

Figure 9:
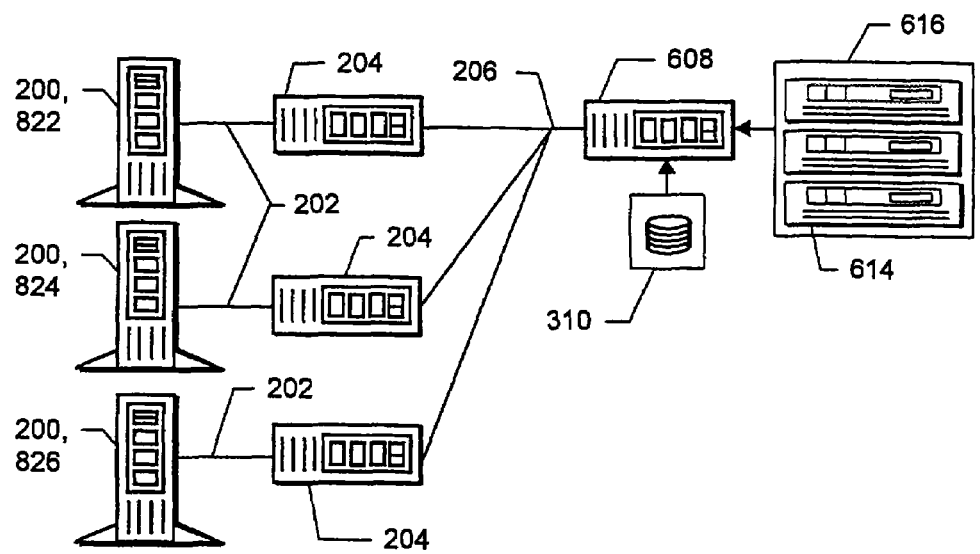
FIG. 9 is a diagram illustrating another many-to-one computer system according to the invention, without a remote server, but including several local servers running different platforms with respective local mirroring units and a single remote mirroring unit having a relatively small buffer and several external storage volumes.

FIG. 9 illustrates systems like those discussed in connection with FIGS. 5 and 8. Unlike FIG. 5, however, the local servers 200 rely on different platforms, and unlike FIG. 8, the remote mirroring unit is a unit 608 which uses a group 616 of external disks 614 instead of a group 512 of RAID units 312.

Figure 10:
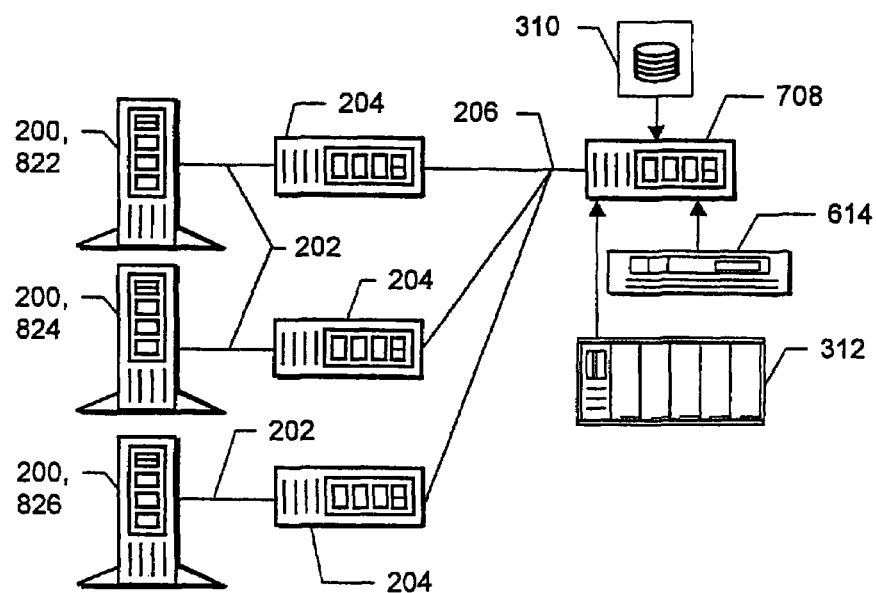
FIG. 10 is a diagram illustrating another many-to-one computer system according to the invention, without a remote server, but including several local servers running different platforms with respective local mirroring units and a single remote mirroring unit having a relatively small buffer, an external storage volume having several partitions, and a hot-swappable RAID unit likewise having several partitions.

FIG. 10 illustrates systems like those discussed in connection with FIG. 7. However, the local servers 200 in systems according to FIG. 10 rely on different platforms. As with FIG. 7, the local mirroring units 204 may be mapped in some systems to partitions or to storage units. When mapping to partitions, the local mirroring units 204 may be mapped to partitions within a RAID unit 312, to partitions within an external drive 614, or to partitions within a RAID unit 312 which are also mirrored to an external drive 614. When mapping local mirroring units 204 to storage units, one or more local mirroring units 204 may send their data through the remote mirroring unit 708 to corresponding external drive(s) 614 while one or more other local mirroring units 204 send their data through the remote mirroring unit 708 to corresponding RAID unit(s) 312.

Figure 11:
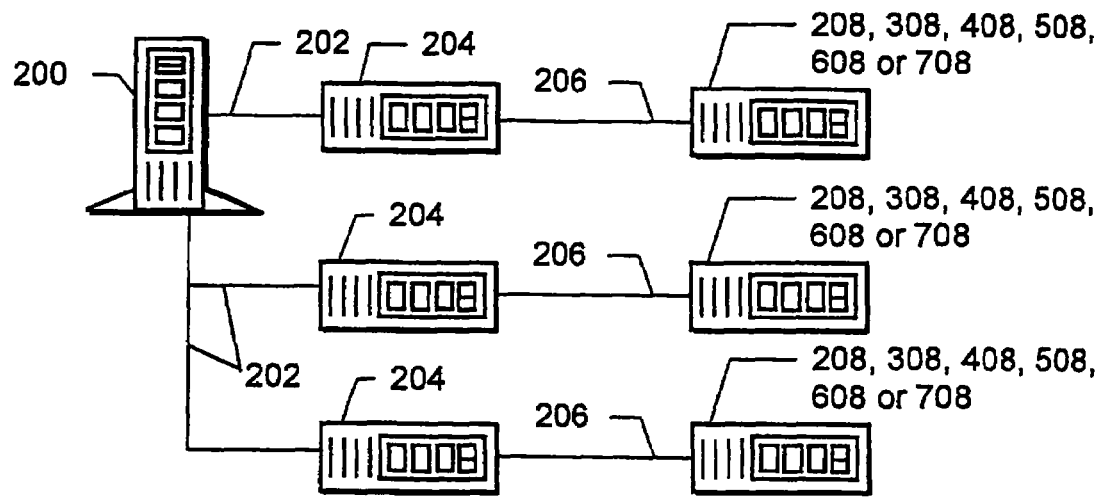
FIG. 11 is a diagram illustrating a one-to-many mirroring computer system according to the invention, in which a local server is connected to several local mirroring units for data mirroring to several remote locations.

FIG. 11 illustrates systems in which data is mirrored to two or more remote locations. Such systems are a counterpart of the systems illustrated in FIGS. 5-10, in the sense that FIGS. 5-10 illustrate "many-to-one" mirroring systems (more than one local server mirrored to one remote destination) while FIG. 11 illustrates "one-to-many" mirroring systems (one local server mirrored to more than one remote destination). In general, the local mirroring units 204 will all be mirroring the same data, but using multiple local mirroring units 204 permits mirroring across at least one journey link 206 to continue uninterrupted despite the unavailability of a given local mirroring unit 204. The local links 202 may all use the same type of connection, or different connections may be used. For instance, one local link 202 may be a SCSI connection while another local link 202 is a USB connection. The journey links 206 may also be uniform or varied. Likewise, the remote mirroring units may each have the same components (e.g., each may use a RAID unit 312), or they may use different components at the different locations.

Figure 12:
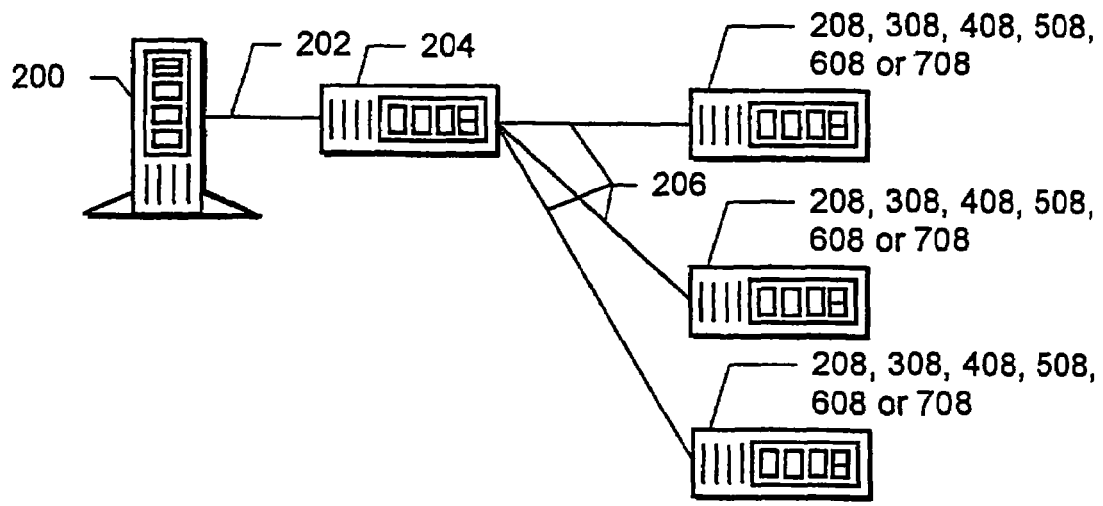
FIG. 12 is a diagram illustrating an alternative one-to-many mirroring computer system according to the invention, in which a local server is connected to one multi-ported local mirroring unit for data mirroring to several remote locations.

FIG. 12 illustrates systems which resemble those illustrated by FIG. 11 in that data is again mirrored to two or more remote locations. However, the local mirroring unit 204 of FIG. 12 is a multi-port mirroring unit. That is, it can be connected simultaneously to more than one journey link 206 in a manner similar to the simultaneous connection of a conventional multi-port server. The multi-port mirroring unit 204 sends mirror data from the host 200 over each of the active connections 206, thereby helping mirror the host 200 to several remote locations which may be miles apart from one another. The multi-port local mirroring unit 204 needs only one local buffer, and like mirroring units 204 in other systems it optionally includes a full local mirror 230.

More on Mirroring Units

The components and operation of mirroring units are discussed above in connection with FIGS. 2 through 12. A given piece of additional information provided below does not necessarily pertain to every mirroring unit in every system according to the invention, but this additional information is helpful nonetheless in understanding how the mirroring units permit greater flexibility to the people and enterprises that are responsible for ensuring that data is properly mirrored.

At least some of the mirroring units can reliably emulate disk drives connected by SCSI, fibre channel, USB, or similar connections through standard server drivers running under Novell NetWare and/or Microsoft Windows NT platforms. SCSI, fibre channel, USB, or similar emulation under other operating systems may also be provided.

Each of the local and remote mirroring units is preferably configured so that it supports I/O through a monitor, keyboard, and a mouse plugged into it. Some mirroring units have a network address and otherwise allow a network administrator to access a specific mirroring unit on the adapted network 100, through a web browser on a remote workstation 116 or by other means.

The mirroring units are preferably Simple Network Management Protocol ("SNMP") capable. The network administrator has remote access to both the local and remote mirroring units. The mirroring unit 204 software provides an interface to monitoring utilities. In particular, each local mirroring unit 204 acts like a network agent in that the unit 204 tracks the number of writes/reads to the local server 200, the status of each local server 200, number of restarts/warm starts of each local server 200, and so forth, and generates SNMP traps when necessary. The following pieces of data may also be provided to administrators by the local mirroring unit 204: the number of blocks currently in the buffer 210; an alert when the buffer 210 fills up and/or fills beyond some specified threshold; the number of blocks sent since server 200 startup; and the number of blocks received since server 200 startup.

Some local mirroring units 204 also have incremental dial-up options. If a customer is using the mirroring unit 204 with a dial-up connection, and doesn't want to be connected at all times, the unit 204 provides an option to send data over the journey link 206 at specified times. Also, the local mirroring unit 204 may have a setting that does not allow data to be sent during periods of high traffic on the adapted network 100 or another portion of the journey link 206. The buffer 210 in the local mirroring unit 204 should be large enough to buffer data received from the local server 200 during these periods of non-transmittal.

More generally, the local mirroring unit 204 preferably matches the performance of a high-speed RAID disk subsystem in terms of data transfer rates, reliability, and compatibility with existing platforms on servers 200. Because an implementation which is primarily in software is unlikely to meet these performance goals, the local mirroring unit 204 preferably comprises special-purpose hardware. The design and construction of suitable software and hardware, including any necessary firmware, may be accomplished by those of skill in the art, with particular attention to the conventional mirroring path 104; the SCSI controllers identified herein or similar SCSI, fibre channel, USB, or similar controllers; individually known subsystems such as buffers 210, 212, 310, disks 614, and RAID units 312, and their interfaces; software such as FreeBSD drivers; Ethernet and other individually known Network Interface Cards ("NIC"); network protocols such as Ethernet and TCP/IP protocols; the descriptions and examples provided herein; and other tools and techniques now or subsequently available to such persons.

Writes to the local mirroring unit 204 should normally be acknowledged and written to the local buffer 210, and may also be written to a full local mirrored volume 230 over a conventional path 104 or another path, although such local mirroring is not explicitly shown in FIGS. 3 through 12. For performance, it is generally acceptable to buffer the writes through a RAM cache in the local mirroring unit 204 or the local server 200 or both. In particular, an implementation may take advantage of an available hardware RAID unit 312 cache or other SCSI, fibre channel, USB, or similar cache. Reads from the local mirroring unit 204 should generally be serviced with the proper data from the local mirror 230.

When the local mirroring unit 204 comes back on-line after a crash or a reboot or any other kind of service interruption, it will automatically begin sending data from its local buffer 210 to the remote mirroring unit 208, 308, 408, 508, 608 or 708. The local mirroring unit 204 should not issue a SCSI, fibre channel, USB, or similar reset, as this may crash the host machine 200. Data written to the local mirroring unit's buffer 210 should be sent over the network or other journey link 206 in a first in, first out fashion, to the remote mirroring unit. This may be done using the TCP/IP or another journey link protocol. The remote mirroring unit preferably maintains a full, consistent, mirror so the remote volume is usable and mountable by an operating system at all times regardless of mirror synchronization status.

At least in embodiments utilizing FreeBSD-based software, kernel panics should preferably not occur on the local mirroring unit 204 unless there is a failure of essential mirroring hardware or software. Misconfiguration of the local mirroring unit 204 software should preferably not result in a system shutdown, nor should any behavior of the host server 200. It is preferably possible to reconfigure the mirroring unit software without a reboot; a unique version number should accompany each software change. Accordingly, the software preferably reads all initialization information and configures itself accordingly through a system call which is available to an administrator without interrupting data processing by the mirroring unit. The host server 200 should not be interrupted. The local mirroring unit 204 preferably accepts writes from the host system 200 whether or not the remote mirroring unit is on-line, and whether or not network or other journey link 206 bandwidth is available, unless the local buffer 210 is full.

If the local buffer 210 fills, the local mirroring unit 204 preferably continues to maintain a local mirror 230 (if present), and preferably continues to dequeue a circular queue of data from the local buffer 210. However, the local mirroring unit 204 preferably stops adding to the queue until told to begin queuing again by a user (typically an administrator) process. A system call, rather than a reboot, preferably allows user-space processes to disable and re-enable local buffer 210 queuing.

The mirroring units preferably auto-detect the disappearance of and reconnection of network or other journey link 206 bandwidth. For instance, disconnecting the local mirroring unit's Ethernet cable and then reconnecting it the next day preferably results in zero data loss and requires no intervention on the network operator's part, provided there is enough space in the local buffer 210 to hold the data changes accumulated while the local mirroring unit 204 was disconnected.

Monitoring software in the mirroring unit, or in connection with those units, preferably determines whether the system was shut down cleanly after the previous boot so that the monitoring software can determine the likelihood that the remote mirror is out of synch. The local mirroring unit 204 preferably loses as little data as possible in the event of power failure. Some mirroring units therefore contain an Uninterruptible Power Supply ("UPS"). It may be assumed there will be time to flush RAM-buffered writes to the local mirror (if present) and/or local buffer 210 in the event of power loss.

In one embodiment, the mirroring unit operating system (e.g., FreeBSD) boots from the hard disk in a read-only mode to avoid filesystem problems with FreeBSD itself. Configuration data is written to a smaller partition and can be restored either from the identical information on the mirroring unit peer, or by sending out a SNMP alert that the mirroring unit has lost configuration data and will be off line until it is restored. The alert can be used if the peer mirroring unit is not reachable. Some embodiments also avoid controller card initialization routines that disk drives would not perform on their own, to avoid bus resets for instance. Also, if the mirroring unit buffer fills up it may be better to simply acknowledge the write and mirror it locally while sending an alert that the buffer is full and the remote mirror is out of sync with the local mirror.

As noted, it is preferably possible to cold-reboot the local mirroring unit 204 without disturbing the host system 200, especially with regard to SCSI, fibre channel, USB, or similar handshaking. The local mirroring unit's buffer 210 retains the order of write requests and transmits them to the remote mirroring unit in the same order they were received by the local mirroring unit 204, to preserving data consistency at all times.

The remote mirroring unit receives TCP Protocol Data Units (also referred to herein as TCP packets), for instance, from the local mirroring unit 204 and writes them to a disk subsystem (such as an external drive 614 or a RAID unit 312) such that the drive is at least logically block-for-block the same as the local mirror 230, if any, and the host 200 volume at a previous time. The mirrored data may be out of date, but it must be consistent.

For data recovery purposes, the remote mirroring unit software preferably has an interface to user-space so that user-space programs can disable or re-enable reading, writing, and/or seeking of the remote mirror by the mirroring unit software, allowing the remote disk subsystem—and hence the mirrored data—to be accessed by a second SCSI host on the same chain. At the remote site, the remote mirroring unit and a backup host server will be attached to the shared disk subsystem. For instance, the remote mirroring unit may use SCSI ID 6 while the remote server used for restoration uses SCSI ID 7. While the remote mirroring unit is mirroring, the remote host will leave the shared drive unmounted. For data recovery, as part of a switchover the remote mirroring unit will stop accessing the shared drive and the backup host server can mount it.

The remote mirroring unit preferably reports to user-space programs the number of blocks received from the local mirroring unit 204. The remote mirroring unit mirrors to the disk subsystem such that the volume can be mounted by a host system with the same operating system as the local server 200 that created the local volume. If the remote mirroring unit receives a request from the local mirroring unit 204 to write to logical block number N, then the data should be written to logical block number N on the remote mirroring unit's disk subsystem 312 or 614. Write requests from local mirroring unit 204 should be written to the remote mirroring unit's disk subsystem 312 or 614 in the order in which they were received by the local mirroring unit 204, to preserve data consistency.

In the journey link 206, communication between the local mirroring unit 204 and the remote mirroring unit can use the TCP protocol, since it features error recovery and transmission guarantee. The remote mirroring unit software acts as a TCP server; the local mirroring unit 204 acts as the remote unit's client. A loss of network bandwidth or connectivity preferably does not interrupt either the local mirroring unit 204 or the remote mirroring unit. Likewise, data recovery at the remote location preferably does not interrupt the local mirroring unit 204. If the connection between the local mirroring unit 204 and the remote mirroring unit times out or is otherwise broken, the local mirroring unit 204 preferably attempts to reconnect until a connection is re-established. Then the local mirroring unit 204 preferably continues sending mirror data where it left off and otherwise resumes normal operation.

The inventive mirroring units are more "intelligent" than the original Off-SiteServer product in that the inventive mirroring units run a modified operating system which is based on the FreeBSD UNIX operating system. One modification included altering the driver for the QLogic SCSI controller to make the card act as a SCSI target rather than a host, so it emulates a disk drive; other controllers could also be used, with suitable drivers. The boot process was also modified to show a mirroring unit configuration utility on the console in place of a login prompt, and the kernel was recompiled. At the source each mirroring unit 204 is running an operating system that allows it to run fully independently of the host server 200. As a result one of the flexible mirroring characteristics provided is that the mirroring unit 204 does not require initialization or connection software on the host server 200 (on the original Off-SiteServer product this software took the form of a Vinca NLM).

Instead, the mirroring unit 204 operating system emulates a SCSI or other standard disk or data acquisition point. So the mirroring unit 204 can be mounted, for instance, as a mirrored SCSI disk under any operating system that supports SCSI, including at least the Microsoft Windows 95, Microsoft Windows 98, Microsoft Windows NT, Novell NetWare, FreeBSD, and Linux operating systems. The disk emulation is preferably carried through to the point that any standard disk operation can be performed (at least from the server 200 perspective), including handling server 200 requests for disk formatting, disk partitioning, disk integrity checks such as scandisk, and so on, in addition to disk reads and disk writes.

A system according to the invention can also maintain a full mirrored volume 230 locally for fault tolerance. Because this mirroring operation occurs by forking the data (or doing two writes) below the emulation layer of the software in the mirroring unit 204, the mirroring unit 204 is able to maintain this local volume 230 along with a sequential data change buffer. This allows the mirroring unit 204 to service local reads by the server 200 without excessive latency, which in turn allows the system to run without a disk handicap and no split-seeks software, eliminating a potential software compatibility problem. This also allows the inventive system to mirror data back to a local disk of the server 200 under local disk mirroring instead of going over the journey link 206. In addition, if a local mirror 230 is maintained then the local mirroring unit 204 need not include a spoof generator to pre-acknowledge writes back to the host 200, because the local mirror 230 is not subject to the delays and risks associated with sending mirrored data over the journey link 206.

A mirroring unit according to the invention normally includes operating system software. Accordingly, at least some mirroring units can run multiple "host" applications to manipulate the mirrored data they have acquired. The system can also be scaled up or down to meet requirements in a particular environment, using drivers and/or other appropriate software and/or hardware. For example, processes could be spread across multiple processors, SCSI cards, and/or other "intelligent" devices to handle more activity and workload. Likewise, a system can be scaled down to reduce costs while still meeting the needs of lower performance environments. With appropriate software the local mirroring unit 204 can run as an independent intelligent disk subsystem, or it can run an emulation of the host 200 operating system as a failover for local fault tolerance. The local disk volume 230 can serve as a local mirrored replacement for local fault tolerance if the host 200 disk subsystem crashes.

The system maintains consistency and availability at the remote location in part by an intelligent buffer 210 that maintains and sends data on a first-in-first-out basis. In this way data blocks are transmitted to the remote location in the exact order they are received through the emulation layer at the local mirroring unit 204. Sequence numbers and/or timestamps may also be used, since packetized data does not necessarily arrive at the destination in the same order it was sent.

Some embodiments use the following approach with a circular buffer and other means for protecting data in the event of a shutdown. In addition to the QLogic card used as the disk target emulator, the local mirroring unit has two disk systems attached to it through a local SCSI disk controller. One disk contains the host operating system (e.g., FreeBSD 3.1) on it, with associated utilities and mirroring unit administrative software. This disk also serves as a buffer 210 disk. The other disk system attached to the mirroring unit is at least as large as the host 200 disk being mirrored and serves as the local mirror 230 of the host 200 disk.

SCSI data is read off of the QLogic card and evaluated in the kernel as read or write requests. Read requests that come from the QLogic card are preferably fulfilled using the local mirror disk 230 and not be sent across the network 206. Write commands are copied directly to the local mirror disk 230 and acknowledged to the host system 200 as soon as possible (but not necessarily pre-acknowledged), as well as added to a circular queue on the buffer disk or in nonvolatile RAM.

Every time a block is written to the circular queue two blocks are actually written sequentially, one being the actual data block to be transmitted, and the other being a timestamp for the current tail pointer for the queue, possibly with other data such as LBN (logical block number). This second block is a so-called meta-data block. This approach is not space efficient, but it reduces the number of disk writes required to maintain the queue pointers. Queue pointers may also be maintained by keeping a copy of at least them, and possibly the entire circular queue, in nonvolatile RAM if such RAM is available. A way to save both space and time is to write to the circular buffer in larger chunks at a time, buffering blocks in memory until enough accumulate to perform a write. This allows the meta-data block to be used for many data blocks, lessening the number of disk write operations and saving on disk space.

In the event of a system shutdown and restart, the head of the queue is found by searching for the block with the most recent timestamp in its meta-data segment, and then using that meta-data segment to locate the tail pointer. This can be done, for instance, by performing a binary search. Since the buffer implementation is circular it is not necessary to remove transmitted blocks physically from the buffer (i.e., by deleting or zeroing them); incrementing the tail pointer effectively does this. Buffer full conditions are detected when the head pointer is one less than the tail pointer. Pointers refer to positions in the circular buffer and not to the data in the buffer itself (i.e., it's an array not a linked list).

It may not be necessary to keep a 64 bit timestamp, since having the most recent second may be enough to determine the last block written before the system shutdown. For example, assume four blocks were written in the same second and have the same timestamp. Then the last block according to the timestamps is the one last written, since this is a ordered queue. If timestamps are too computationally expensive a simple incrementing counter may suffice, though it could roll-over sooner than the year 2038. The queue buffer size changes, depending upon the end-user's data change rate and the length of time the customer needs to withstand a network 206 outage. The queue buffer could be as small as a few hundred megabytes, or as large as the host volume being mirrored. There are no inherent restrictions on the minimum or maximum size of the buffer, and in cases where high data change rates and frequent lengthy interruptions of the journey link 206 are anticipated, the buffer may need to be larger than the host volume being mirrored.

A separate process, which may run in user-space or system-space, reads blocks out of the circular queue and sends them across the network 206 to the remote mirroring unit. This transmitting process can inform the queuing process from time to time as to the transmitting process's current pointer position and can watch the timestamps to determine when the queue is empty. It may be fine if the tail pointer being saved in the meta-data is a little out of date, because in the worse case the system will end up resending a number of blocks it has already sent, provided the resend number does not grow to an excessive size in the event of a system restart. Preferably, the transmitting process can also determine the number of blocks since server startup. In some cases it can be presumed that the buffer will be able to buffer the entire host volume. Under a "do no harm" philosophy it would be better to not take a risk of slowing the SCSI bus down and simply dump data that will not fit into an already full queue, and inform user-space monitoring processes of this event.

To attempt to reduce the number of resent blocks, the system may check writes against the local mirror and only add them to the circular buffer if they are indeed different, while avoiding any lazy write problems. This might be accomplished by maintaining a hash table of checksums for each LBN on the disk; one tradeoff would be processor time computing checksums and memory vs. additional disk operations.

Methods Generally

Figure 13:
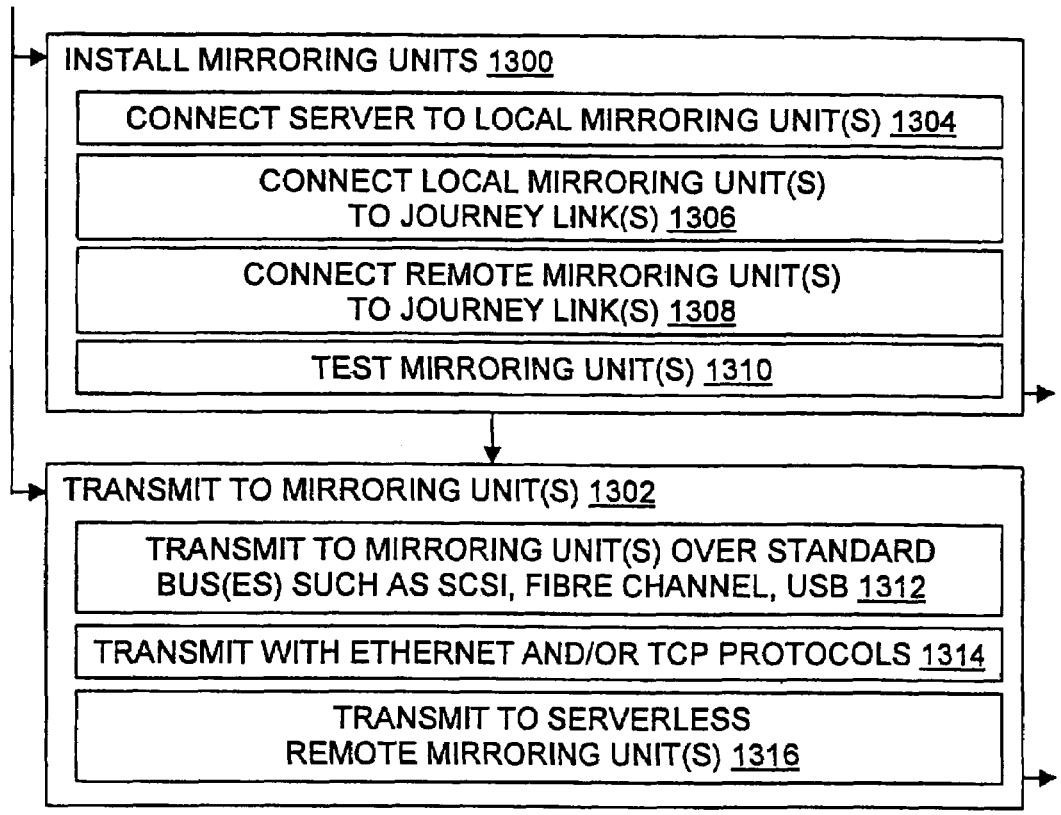
FIG. 13 is a flowchart illustrating methods of the present invention.

FIG. 13 illustrates methods of the present invention for remote data mirroring. Some methods include steps for installing mirroring units; for convenience, these steps are collectively identified as steps within an installing step 1300. For instance, system integrators, mirroring equipment vendors, and administrators may be licensed to perform some or all of the steps shown within step 1300 when installing systems such as those illustrated in any of FIGS. 2 through 12. Other methods of the invention include steps for transmitting data to one or more mirroring units; for convenience, these steps are collectively identified as steps within a transmitting step 1302. These transmitting steps may be performed under license with test data by installers as part of the installing steps 1300, but they may also be routinely performed with mission-critical data at the behest of regular users of a system according to the invention.

During a connecting step 1304, at least one server 200 is connected to at least one local mirroring unit 204. As discussed above, this connection may be in the form of a SCSI bus, a fibre channel connection, a USB connection, or some other standard disk subsystem bus. Because the one local mirroring unit 204 emulates a disk subsystem, connecting it during step 1304 is basically the same as connecting a conventional disk subsystem to the server 200, at least from the point of view of the server 200. In particular, no special mirroring NLM or other mirroring software installation is required.

During a connecting step 1306, at least one local mirroring unit 204 is connected to at least one corresponding journey link 206. Depending on the situation, this may involve various operations. For example, if the journey link 206 includes a local area network then the local mirroring unit 204 may be connected to that network like other network nodes; SNMP support may also be configured. If the journey link 206 includes a dial-up connection from the local mirroring unit 204, then the dial-up parameters are configured. Likewise, if the journey link 206 includes a dedicated private telecommunications line such as a T1 line, then familiar operations are performed to make the connection.

During a connecting step 1308, at least one remote mirroring unit 208, 308, 408, 508, 608 or 708 is connected to at least one corresponding journey link 206. This may be accomplished in generally the same manner as the connection of the local mirroring unit 204 during step 1306. However, when the remote mirroring unit acts as a TCP server in a given embodiment, the local mirroring unit 204 acts as the remote mirroring unit's client. Thus, in such embodiments the connecting step 1306 connects a TCP client while the connecting step 1308 connects a TCP server.

During a testing step 1310, tests are performed on the mirroring unit(s). These tests may include, for instance, comparing throughput performance of the local mirroring unit 204 with the performance of a RAID unit; re-mirroring data from the remote site back to the local site; putting incorrect configuration information into the local mirroring unit 204 and then correcting that information; rebooting the local mirroring unit 204; disconnecting the journey link 206; interrupting power to the local mirroring unit 204; interrupting power to the remote mirroring unit; overflowing the buffer 210 of the local mirroring unit 204; and other tests. In particular and without limitation, the testing step 1310 may involve performing one or more of the tests described in the "test suite" section of this document. Testing 1310 may also involve transmitting data as discussed below in connection with step 1302, but testing is shown as a separate step in FIG. 13 for clarity of illustration.

The transmitting step 1302 may include a transmitting step 1312 which sends data from the server 200 over a standard bus to the local mirroring unit 204. This is possible because the present invention, unlike the conventional path 104, provides a mirroring unit which emulates a disk or RAID subsystem.

During a transmitting step 1314, the data being mirrored is transmitted over the journey link 206. As noted, this may be done with a dedicated link as was the case with the conventional path 104, but it may also be done using standard protocols such as Ethernet and/or TCP and/or other open standard protocols, including their associated conventional networking infrastructure such as local area networks and/or the Internet.

In some embodiments, the mirrored data is time-stamped by the local mirroring unit 204 to maintain a record of the sequence in which blocks of data were mirrored and to also tie the data to a particular point in time. This is coupled with remote and/or local data storage large enough to hold one or more snapshots of the mirrored volume plus incremental changes at the sector/track/block level to that volume, instead of simply holding a current copy of the mirrored volume. In a preferred embodiment only one snapshot is needed. The single snapshot provides a baseline, and subsequent changes are journaled so that the state of the volume at any desired point (subject to the journaling granularity) can be recovered. The journal may be arbitrarily large with additional storage space added as needed to hold it, or it may be kept in a FIFO circular buffer of some fixed size, with older journal entries overwritten by new ones after the journal buffer is initially filled. More generally, suitable re-mirroring software plus the snapshot(s) and (if necessary) the incremental changes can be used at a later time to reconstruct the mirrored disk volume as it existed at a specified previous time.

During a transmitting step 1316, the data being mirrored is transmitted to a serverless remote mirroring unit. This configuration is illustrated by FIG. 2, for instance. The remote mirroring unit is not a conventional server, although it has hardware and functional capabilities in common with such servers. Servers provide more general functionality than mirroring units; mirroring units are focused on effectively providing substantially continuous, nearly real-time remote data mirroring. The remote mirroring unit behaves like a remote mirroring server with regard to acquisition of data over the journey link 206 but otherwise strongly resembles a mounted disk. In particular, the remote mirroring unit behaves like a disk or RAID unit with regard to a secondary server if one is attached. No secondary server is needed for the remote mirroring unit to re-mirror all the data back over the journey link 206 toward the local server 200 if that becomes necessary.

After data is transmitted from the local mirroring unit 204 to a remote mirroring unit at the destination, the remote mirroring unit can do various things. For instance, the remote mirroring unit may simply convert the received data packet into data blocks that are written out to a single external disk 614. The remote mirroring unit may convert these data packets into disk blocks and write them to an internal disk subsystem and/or disk partition. The remote mirroring unit may receive the packet data, convert it to disk data blocks, and write them to a RAID unit 312 in the form of an external data subsystem utilizing internal striping (RAID) software to stripe data across multiple disks on an "unintelligent" disk subsystem. This same conversion from packets to disk block data to striped (RAID) data could also occur through a hardware controller and related driver, with storage to an external "unintelligent" disk subsystem. The remote mirroring unit may also write to an external intelligent RAID subsystem 312, with disk blocks being written to the disk subsystem in a data stream and striped by the intelligent RAID subsystem.

Rather than write the received data immediately to the remote mirror 312 or 614, the remote mirroring unit may write the data first to a remote buffer and then send an ACK with some type of "signature" of the data (such as a checksum or Cyclic Redundancy Check value) back to the local mirroring unit. The local mirroring unit would then either ACK-ACK or NAK-ACK (based upon verification of the signature) the data; only upon receiving an ACK-ACK from the local mirroring unit would the remote mirroring unit commit the data from the remote buffer to the remote mirror. In such embodiments, if the remote mirroring unit receives not only the data, but also an original signature from the local mirroring unit, it will NAK the original data transmission if the original signature does not verify correctly.

More generally, various approaches to ACKing data are possible. For instance, one may view the remote mirroring unit and the local mirroring unit as being peers, rather than either being a subsystem of the other. In this case, on the remote mirroring unit, ACKs trickle up from the remote mirror disk itself (probably from its cache); on the local mirroring unit, ACKs also trickle up from the local mirror disk itself (probably from its cache); but on the local mirroring unit, ACKs would not be needed from the remote mirroring unit, only from the local end of the journey link, before ACKing the host. It would still be prudent on the local mirroring unit to wait for an ACK from the remote mirroring unit before deleting blocks from the local buffer, but this can be done long after ACKing the host.

Additional steps are possible if at least one secondary server 300 is present in the system. For instance, the remote mirroring unit may relay data directly to a remote server 300 through the server's network operating system. This operating system can be in an active or passive state. In either case data received through the connection 302 can be written to an internal local disk subsystem through the server 300 operating system. This approach requires specific software for each operating system at the remote location. The remote mirroring unit may also use an Internet-based data window to send and receive data between the remote mirroring unit and a secondary server 300. This data window could be through a plug-in extension to browser interfaces or though Internet component extensions to the core operating system, such as Microsoft ActiveX extensions.

In any of the scenarios above, the local mirroring unit may be "intelligent" enough to relay mirrored data to one remote mirroring unit or to many remote mirroring units; a one-to-many system like that shown in FIG. 12 has three remote mirroring units connected by respective journey links 206 to a single multi-ported local mirroring unit 204 and multi-port mirroring units may likewise be used, alone or in combination with single-port mirroring units, in other systems according to the invention. There is no hard limitation on the number of remote mirroring units in a given system.

The remote mirroring unit can also relay mirrored data to a nearby mirroring unit and/or another more distant remote mirroring unit for further fault tolerance. A remote mirroring unit can act as a head end to load balance between two or more following remote mirroring units to distribute loads and provide fault tolerance, with appropriate attention to continuous consistency and completeness of the data mirrors. N remote mirroring units can be connected to each other and maintain the same network address or Domain Naming System ("DNS") name to provide further fault tolerance. Combinations of these various approaches can also be used.

In embodiments having one or more separate fully independent remote disk subsystem(s) connected to the remote mirroring unit, the remote mirroring unit behaves as a SCSI master (for instance) and writes data out to the remote disk(s). If a secondary server 300 is present, this server 300 follows both the remote mirroring unit and the remote disk subsystems(s) in the SCSI chain. During data mirroring, the secondary server 300 is typically a slave and/or in a passive state. In the event of failure of the mirrored local server 200, the remote server 300 mounts the external volume(s) and becomes a SCSI master. At the same time the remote mirroring unit dismounts its remote disk subsystem driver and goes into a passive (slave) state.

Figure 14:
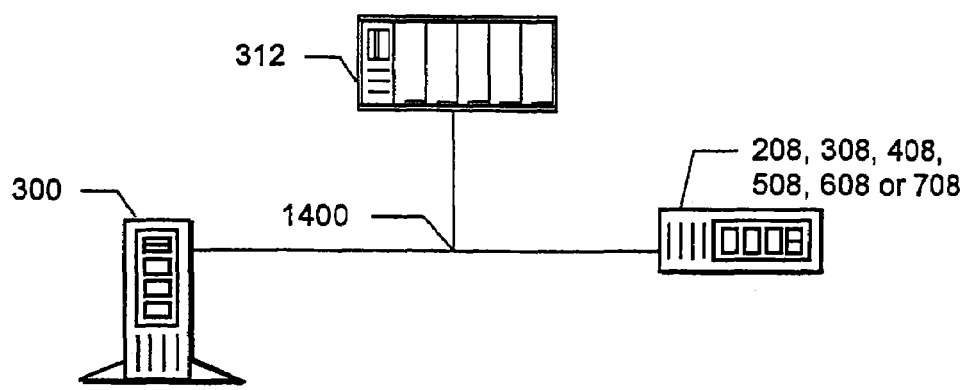
FIG. 14 is a diagram illustrating a dual host configuration between a remote mirroring unit, a remote server, and a RAID unit, which may be used in performing a switchover according to the invention.

In particular, this can be accomplished using a configuration like that shown in FIG. 14, which includes a "dual host" connection 1400. Under many conventional approaches, only one host adapter lives on a SCSI chain, typically as LUN 7. During power up or reset, the host cycles through all the other LUNs to determine what is connected. If a system uses a dual host capable adapter then the second host typically lives at LUN 6, and it will only reset or interrogate LUNs 0-5. Thus LUN 7 might be considered the primary and LUN 6 a secondary. In any event both hosts have "access" to the lower ordered targets when connected as shown in FIG. 14.

Dual host connections themselves are not new. In particular, a dual host connection with BusLogic EISA cards and a Novell NetWare server is known. However, the inability of that Novell server to refresh its file allocation table on a demand basis rendered moot the capabilities provided by the dual host connection in that case. General information about dual host connections is publicly available from sources which include an online SCSI FAQ. If a dual host connection is not used, then the remote server 300 requires a driver, NLM, and/or other software dedicated to mirroring so the remote server 300 can receive mirrored data directly from the remote mirroring unit and store it for possible later use.

In embodiments according to the present invention which use a dual host configuration 1400, the remote mirroring unit 208, 308, 408, 508, 608, or 708 controls the RAID unit 312 or other remote disk subsystem until such time as it is commanded to stop so that a switchover can be performed. During this time the remote mirroring unit performs remote data mirroring and as SCSI master it sends data to the RAID unit 312 as discussed elsewhere herein. During this time the Novell or other secondary server 300 is in a passive (dismounted) state. This prevents damage that would otherwise occur by wiring together the server 300, remote mirroring unit, and RAID unit 312 or other remote disk subsystem in a two-to-one manner as shown in FIG. 14.

To perform a switchover, the remote mirroring unit dismounts the RAID unit 312 driver and the server 300 mounts the RAID unit 312. The server 300 then becomes the SCSI master. Since one cannot necessarily predict or enforce the secondary server SCSI card selection, the remote mirroring unit preferably has the secondary host position (LUN 6). As the two machines come up, the remote mirroring unit may experience a second reset as its driver powers up. This is normal, but the remote mirroring unit should be able to recover at the device driver level. Note that by utilizing the dual hosting (not dual channel) method, the cabling becomes a normally terminated SCSI chain; no additional hardware is required. The switchover can be accomplished entirely by software, through storage subsystem and/or driver dismount, mount, and related operations.

The previous discussion may be viewed as implicitly assuming a one-to-one relationship between a remote mirroring unit and a secondary server 300. However, a software or mechanical SCSI switch (for instance) could be employed to allow connection of a remote mirroring unit to several potential host servers 300. In protocols such as fibre channel and/or in SAN architectures there is not a traditional SCSI master/slave relationship. There is instead an address relationship that occurs through DNS and/or numeric addresses. In such systems, the switch-over would occur though an address change, with the remote mirroring unit still going into a passive state.

The remote mirroring unit can be made to run a full network operating system. In the event of a disaster such a remote mirroring unit could go into an active state and become a fully functional server for the information on the disk subsystems to which it sent mirrored data. The remote mirroring unit could also run an emulation program that would allow it to emulate a server under a specified host operating system at the local site. The remote mirroring unit could also run a program to shut down the operating system it employed under mirroring, and any related programs, and then restart under a specified host operating system from a separate internal disk or a separate partition.

The remote mirroring unit could also be enhanced to run continuously as a secondary server rather than being normally dedicated to data mirroring only. However, doing so could severely reduce mirroring performance, as well as increase the risk that mirroring fails outright.

If the remote mirroring unit has essentially the same software as the local mirroring unit 204, then the remote mirroring unit can perform as a local mirroring unit 204. For instance, when mirroring from site A to site B to site C, a mirroring unit at site B is a remote mirroring unit with respect to site A and a local mirroring unit with respect to site C. The remote mirroring unit can also perform as a local mirroring unit 204 in a recovery from the remote location back to the source. That is, when mirroring from site A to site B, the mirroring unit at site A is local and the mirroring unit at site B is remote, but in recovering data from site B back to site A, the mirroring unit at site A is remote and the mirroring unit at site B is local.

Finally, some inventive systems can accommodate multiple user sessions; a user session being a mirrored data relay or storage session. Multiple combinations and instances of the above scenarios can thus occur concurrently or separately in the appropriate environment. It may be necessary to include more processors, disks, memory, and so on to accomplish particular combinations.

These various tools and techniques can also be used in a one-to-many mirroring system or a many-to-one mirroring system according to the invention. Likewise, discussion of tools and techniques which refer to packets, refer to an IP, Ethernet, token ring, or other packetized data environment, and it will be understood that other supported environments may write in data streams instead of using packets.

The method steps discussed above and elsewhere herein may be performed in various orders and/or concurrently, except in those cases in which the results of one step are required as input to another step. For instance, connecting steps 1304, 1306, and 1308 may be done in various orders and/or concurrently, but many operations in the testing step 1310 will assume that some or all of the indicated connections are present, at least nominally. Transmitting data to a local mirroring unit during step 1312 necessarily precedes transmitting that data over the journey link 206 or to a local mirror 230 during step 1314. On the other hand, transmission step 1316 may be performed by performing transmission step 1314 (or by using a private dedicated link 206) if the transmission is to a serverless remote mirroring unit. Steps may also be omitted unless called for in issued claims, regardless of whether they are expressly described as optional in this Detailed Description. Steps may also be repeated, combined, or named differently.

Configured Storage Media, Signals

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, flash memory, and other media readable by one or more of the computers. Each such medium tangibly embodies a program, functions, and/or instructions that are executable by the machines to perform flexible mirroring method steps substantially as described herein, including without limitation methods which perform some or all of the steps illustrated in FIG. 13 and methods for installing and/or using the systems illustrated in FIGS. 2 through 12. The invention also provides novel signals which are used in or by such programs. The signals may be embodied in "wires", RAM, disk, or other storage media or data carriers.

Additional Information

To further assist people and enterprises in understanding and properly practicing the invention, additional insights and details are provided below. These comments are given with the continued assumption that discussions of any one of the embodiment types (methods, systems, configured storage media) also apply to the other embodiment types unless clearly indicated otherwise.

Specific Examples of the Invention's Improvements

Many other solutions to the problem of data protection (tape backup, local clustering, replication, shadowing, remote mainframe channel extension, and so on) are in some way directly connected to and dependent upon the host 200 operating system. This dependence creates problems to the customer, which may be avoided by using the present invention. For instance, the reliance on dependent dedicated software can cause compatibility problems and bugs when that software does not fully work with the current host operating system or with an upgrade to the operating system. Software solutions that depend on dedicated host mirroring software can also present a performance problem because they impose additional work on the host. Dependent software solutions can also be a point of instability. As disk volumes become larger and software and operating systems become more complicated these problems increase for approaches that require dependent software. In addition, if the host 200 operating system freezes up then solutions which depend on that operating system also stop working.

By contrast, in at least some embodiments the present invention does not have any software that loads on the host computer (e.g., local server 200), thereby reducing or avoiding the aforementioned problems. If the host operating system freezes the mirroring units continue to operate and mirrored data is available because the mirroring units are running their own operating system(s). Unlike solutions that need to be substantially modified at their core as disk volumes increase and software gets more complicated, the invention scales readily. If a faster processor comes out one simply uses this processor in the mirroring units as desired. If the disk size is bigger, one puts bigger disks in mirroring units. If the data change rate exceeds current ability to write to disk, one uses a caching controller and adds memory to the system. Some other solutions require cooperation from the operating system manufacturer in order to integrate and operate properly without bugs. Because all operating systems will support SCSI and fibre channel (for instance) for the foreseeable future, such cooperation is not required for installation and use of the invention.

When other solutions fail they can take the host 200 with them, because of the close interactions outlined above. Because the invention can operate independently of the host 200, if it fails it need not seriously affect the host computer. Conventional disk mirroring was originally designed for local fault tolerance. Two disks would be written to in parallel, and if one disk failed the computer would continue to operate. The disk that failed would be dismounted from the operating system in the background. The operating system and computer would often continue to run without missing a beat. Because the inventive mirroring unit can look like a SCSI disk and be mounted as a mirrored disk, it provides a similar advantage. If a mirroring unit dies, it simply gets dismounted. For instance, if the operating system or other software on the mirroring unit fails then the mirroring unit stops emulating a disk. As a result, the operating system on the host 200 no longer recognizes the mirroring unit. In response, the operating system on the host 200 simply dismounts the mirroring unit 204 and continues to run.

At least some previous mirroring system implementations used a single disk IDE buffer. Even with spoofing, such a smart buffer has not been able to keep up with high speed SCSI RAID units with hardware striping. The most critical data that was being transmitted to the remote location was trusted to a single disk with no fault tolerance at the smart buffer level. With the present invention, by contrast, the local and remote mirroring units can both mirror a single disk buffer for fault tolerance, and they can perform hardware RAID striping across multiple disks. This provides an ability to keep up with new high speed storage subsystems on servers, and better fault tolerance. In the event of an individual disk failure in the server 200 volume or a mirroring unit disk 210, 310 this also reduces the risk of losing buffered data.

The limited data input capabilities of the prior approaches made it very difficult to address new technologies that are gaining market acceptance. For example, under at least some prior approaches there is no Storage Access Network ("SAN") or Network Attached Storage ("NAS") support. Requiring a standard remote server such as the server 300 made it hard or impossible to provide backup and mirroring for the SAN and NAS disk subsystems that are becoming more prevalent. However, all of these subsystems can perform a local mirror through Ethernet, fibre channel, and/or SCSI. The inventive mirroring units can accept multiple input types, including SCSI, Ethernet, and fibre channel inputs.

The invention also provides support for larger storage subsystems. Many earlier fault tolerance solutions were designed for an environment in which a six Gigabyte storage volume was considered very large. With storage costs falling, disk subsystems are increasing in size at a very rapid rate. It is now common for servers to have volumes of 100 Gigabytes. The invention accommodates these larger volumes in part by handling synchronization for the host server 200 in the background, namely, on the mirroring unit. Offloading this task from the host server to the mirroring unit(s) allows a true mirror of the main host server 200 without a large performance decrease. By contrast, alternative "clustering" and/or mirroring solutions that require a local server to handle the synchronization required for a mirror may either severely slow or crash that primary server.

At least some previous implementations of re-mirroring have required the local server 200 to intervene if the local buffer could not support the entire local volume, although implementations have done much to avoid re-synchronization of mirrored disks (re-mirroring), over the telecommunications link. Re-mirroring slowed the main/primary/host server 200 to a standstill, and could take several days. So the re-mirroring has generally been performed only on weekends when the network could run slower, as there would be fewer users. But as disk subsystems are getting larger this is no longer acceptable. The invention supports nonvolatile storage, not only at the remote location but also in the local mirroring unit 204, which is large enough to hold the complete volume that is being mirrored to the remote location. This allows the local mirroring unit 204 to pre-acknowledge the complete local disk storage volume into a localized smart buffer and perform the tasks related to a re-mirror in the "background" from the server 200 perspective.

In at least some prior approaches, the limitation of the maximum rate of a T1 output, from either the local or remote location, slowed a re-mirror even if a frame relay network, ATM, and/or VSAT network was available. By contrast, the invention flexibly allows a larger I/O pipe capability, which can improve performance because re-mirrors will be quicker and data deployment will be more efficient. If mirrored data being stored remotely becomes unavailable, the data stored at the unavailable site can be moved at high speed to another facility using a high-speed private data network. These data networks usually support bandwidths up to an OC48 rate (2.488-Gigabits per second). An example of this might be a customer that normally mirrors their data to Chicago and now needs to use the facility in New York for recovery. This type of need is much more common than originally realized.

The original Off-SiteServer product failed to provide an open Application Programmer Interface ("API"). It was written instead solely to closed proprietary hardware (MiraLink's) and closed proprietary software (Vinca's). If a corporate customer had needs that exceeded the scope of that product there was generally no easy way to make custom modifications or adjustments. By contrast, the present invention permits an open API so that adjustments can be made from user-space processes to address specific customers and/or emerging markets. In particular, and without limitation, the present invention preferably has an API which provides one or more calls to reconfigure a mirroring unit without interrupting the server 200, and also provides a call to reboot the mirroring unit without interrupting the server 200.

Configuration Data

System configuration data is preferably distributed, so that if one of the mirroring units loses configuration data, that configuration data can be recovered from one of the unit's peers. Basic configuration data such as network information is preferably stored in nonvolatile storage (e.g., on disk, or in battery-backed semiconductor memory), so that even if the configuration data on the disk is lost, the configuration data can still be restored from the peer mirroring unit.

A world wide web interface preferably provides, at a minimum, the following configuration options or their equivalents: IP address (remote/local); gateway (remote/local); net mask (remote/local); administrator password (shared); buffer size (local); buffer high water mark (buffer filled beyond acceptable limits); volume size (configurable up to a factory-configured hard max); SCSI target Logical Unit Number ("LUN"); and SNMP configuration (remote/local).

The SNMP configuration itself preferably contains the following: add/delete SNMP monitoring hosts (remote/local); event polling intervals; buffer filled past acceptable limits; network connection failure; buffer full; remote out of synch; add/delete e-mail recipient.

The web interface preferably provides, at a minimum, the following status information: blocks in buffer; blocks sent; blocks received; mirroring unit version; mirroring unit serial number; volume size; whether this unit is remote or local. The web interface preferably provides an unmount remote utility. The web interface preferably also provides a log dump report. SNMP and SMTP traps are generally used for the following events: buffer filled past acceptable limits; buffer full; network connection failure; remote out of synch.

The administrative tools may provide notifications by e-mail, by paging, or other means. Notification may be real-time and/or in combination with automated logs or automatically generated reports. Notifications may be sent to system administrators and/or vendors. In embodiments which run a web server/mail server package as an interface many of the characteristics of a web server are available. For instance, users can access and mange the mirroring unit either locally or remotely. Depending on permissions, users can access the mirroring unit internally to the company and/or from anywhere in the world. A mirroring unit can notify users (and mirroring unit vendors) of problems or significant events on the mirroring unit via e-mail as well as through SNMP. One can write custom scripts for this e-mail so that different users or groups of users are notified. Report outputs are not necessarily static. If a customer requires custom reports for their management instead of copying the required information each month and writing the report over and over again, the customer or a certified developer can use HTML, JAVA, and/or other familiar tools and techniques to have the mirroring unit generate and e-mail the report as needed in the desired format.

Basic Hardware

In general, a system according to the invention includes basic hardware such as a standard Pentium II, Pentium III, AMD K6-3 or AMD K7 class PC-compatible computer (marks of their respective owners). In various configurations the machines preferably have at least 64, 128, or 256 megabytes of RAM, and a rack-mounted case. They also preferably contain one 100 Mb Ethernet card, FDDI card, or the like. For disk interfaces, the machines preferably have a QLogic SCSI card for disk emulation and an Adaptec 2940UW adapter for buffer and mirror control, or a FreeBSD supported DPT brand RAID card. Caching may be used, including RAID or SCSI controller caching, caching in volatile RAM in the mirroring unit(s), caching in nonvolatile RAM (e.g., static RAM or battery-back RAM) in the mirroring unit(s), and otherwise. Caching tools and techniques familiar to those in the art may be readily adapted for use according to the present invention.

In some embodiments, if N is the size of the volume to be mirrored, then local mirroring units 204 which include a local mirror 230 have storage capacity of at least N for that local mirror. In some embodiments, a disk system, which serves as the local buffer 210 (with or without a local mirror) has a capacity of at least six-fifths N, that is 1.2 times N. The remote mirroring unit has at least one disk system, for the remote mirror, of size at least N. In all scenarios, the local mirroring unit buffer 210 may need to be equivalent in data capacity to its remote mirroring unit, including buffers and hot-swappable RAID subsystems, to permit a local re-mirror.

Test Suite

Tests used to gauge performance of a system according to the invention preferably include analytical tests which can be used to gauge relative performance and Boolean (pass/fail) tests that cover critical functional specification conformance criteria. A Boolean test is passed if the specified answer to all questions are correctly matched by test results. The Boolean tests can be used to determine the suitability of deliverables.

Tests should preferably be passed both in a local network configuration (where the journey link 206 is within a single local area network) and in a local and remote configuration (where the local mirroring unit 204 and the remote mirroring unit are geographically distant from each other). For instance, a remote network configuration could consist of two sites connected together with a T1 link 206 or an equivalent amount of public Internet bandwidth as the journey link 206.

Analytical tests preferably use a standard disk hardware test suite such as Bonie (for UNIX) or PCTools (for Windows NT and Novell clients). The tests compare performance of a native disk drive (for which the model, size, and characteristics are noted) with the performance of a flexible mirroring unit 204. The performance outputs are noted for later reference.

The following questions are preferably asked, and any necessary correction is made until they are answered as indicated.

Is the mirroring unit 204 recognized by host 200 operating system as a disk with the correct configured size? (Yes)

Can data be read and written to the mirroring unit 204 without loss? (Yes)

Can the host system 200 perform arbitrary file operations with data on the mirroring unit 204 for forty-eight hours without error? (Yes)

Can a local mirroring unit 204 configured with a 100 megabyte host volume and a remote network configuration successfully mirror data to a remote mirroring unit with a data rate of at least 300 megabytes/hour and preferably higher if FDDI or other support is present? (Yes) Note that the 300 megabytes/hour rate is under the maximum carrying capacity for a T1 connection by about 50%; T1 capacity is about 617 megabytes/hour.

Can the local mirroring unit 204 be rebooted fully without the attached host system 200 failing to operate in a normal manner, namely, does the host 200 continue fulfilling its intended purpose without significant performance degradation? (Yes)

When the local mirroring unit 204 comes back on line does it automatically start to transfer across the network or other journey link 206 (e.g., using TCP sockets) data that was left on the local mirroring unit 204 queue, sending that data to the remote mirroring unit without loss of data? (Yes) Note that this should be confirmed by mounting the remote mirroring unit's drive on the host system 200 before and after rebooting the local mirroring unit 204 while it is attached to the host system 200. The remote mirror should be mountable after such an event without significant need for file system repair. Data should not be lost and should make sense to the application programs that created it. After mounting the remote mirror on the local host system 200 physically, is the host system 200 able to mount the mirror and are application programs on the host 200 and its clients able to use data on the mirror successfully? (Yes)

In response to an input of improper information such as a wrong remote IP address, or an invalid SCSI ID (less than 0 or greater than 15), does the mirroring system crash or hang? (No) Can the user correct the information, re-initialize the software and have it perform normally without needing a mirroring unit reboot? (Yes) Does all software display a correct version number and copyright statement? (Yes)

In response to a disconnection of the network cable 206 for a period of 30 minutes and preferably for longer periods while a mirroring operation or other disk I/O intensive operation is being conducted by the host system 200, does the local mirroring unit 204 continue to work? (Yes) Is it recognized by the host operating system as a disk with the correct configured size? (Yes) Can data be read and written to the local mirroring unit 204 without loss? (Yes)

After an initial mirror has been established, disconnect the network cable for twenty-four hours and perform periodic re-runs of the tests. Is the local mirroring unit 204 still recognized by the host 200 operating system as a disk with the correct configured size? (Yes) Can data still be read and written to the local mirroring unit 204 without loss? (Yes)

Likewise, after forcing the host system 200 to overflow the buffer 210 (e.g., by re-mirroring multiple times), verify that the local mirroring unit 204 still operates properly to the extent possible. Is the local mirroring unit 204 still recognized by the host 200 operating system as a disk with the correct configured size? (Yes) Can data still be read and written to the local mirroring unit 204 without loss? (Yes) Can a user stop the en-queuing process and restart it without requiring a local mirroring unit 204 reboot? (Yes) Can a user can stop the de-queuing process and restart it without requiring a local mirroring unit 204 reboot? (Yes) Can a user selectively flush specified portion(s) of the buffer, e.g., flush an aborted mirror without flushing a full mirror if the data is at least partially remirrored more than once? (Yes)

While a mirroring operation or other disk I/O intensive operation is being conducted by the host system 200, disconnect the network cable or other journey link 206 for a period of thirty minutes. Can the local mirroring unit 204 start sending data from the queue to the remote mirroring unit after re-establishing a physical network connection? (Yes) Are valid statistics available from the local mirroring unit 204 as to the status of the buffer (e.g., full or not full, number of blocks in the buffer, and the number of blocks transferred from the buffer and received on the remote side)? (Yes)

Unplug the local mirroring unit 204 UPS, shut down the host system 200, and wait for the power to fail on the local mirroring unit 204. Restore power to the local mirroring unit 204 and then to the host system 200. Does the host system operate properly? (Yes) Can the local mirroring unit 204 be rebooted fully without the attached host system 200 failing to operate in a normal manner? (Yes) When the local mirroring unit 204 comes back on line does it automatically start to transfer across the network or other journey link 206 data left in the local mirroring unit 204 buffer 210, without loss of data? (Yes) Note that the last two of these remote mirror mounting tests should be performed both before and after this simulated power failure. Do they pass? (Yes)

In addition, do all previous tests succeed with a host volume size of 200 gigabytes? (Yes)

Can the remote mirroring unit be disabled and the remote mirror mounted by a standby server running the same operating system as the primary host system 200? (Yes)

Will the remote host then operate normally and without adverse impact on its performance? (Yes) Note that the operation of the previous two tests is supported by having the remote backup host attached on the same SCSI chain as the remote mirroring unit and its remote mirror disk subsystem 312 or 614.

SUMMARY

The present invention provides tools and techniques for data mirroring, locally and/or remotely. In particular, a computer system for remote mirroring of data according to the invention includes one or more flexible mirroring characteristics. Systems for local mirroring (e.g., where the source and destination are less than ten miles apart) may also have such flexible mirroring characteristics.

For instance, the system may be characterized by having a serverless destination. That is, one embodiment of the system mirrors data from the local server 200 as a source through the local mirroring unit 204 to the remote mirroring unit 208, 408, 508, 608, or 708 as a destination, without requiring the use of a remote server attached to the remote mirroring unit.

The system may also be characterized as non-invasive, in that no software designed specifically for remote data mirroring need be installed on the local server 200. Similarly, no such software need be installed on the secondary server 300 in systems that include a server 300. Instead, each mirroring unit runs an operating system and one or more remote data mirroring application programs (including threads, processes, tasks, etc.). For instance, the mirroring units rather than the server(s) buffer data to be mirrored, create and monitor connections over the journey link 206, and transmit/receive mirrored data over the journey link 206, thereby relieving the server(s) of those tasks. Likewise, the system may be characterized by disk emulation, such that the system mirrors data from the local server 200 to the local mirroring unit 204 through a standard storage subsystem bus. Suitable standard storage subsystem buses include SCSI, fibre channel, USB, and other nonproprietary buses. Such buses are also referred to herein as "connections" to the local mirroring unit 204.

The system could be characterized by a TCP journey line characteristic and/or by an Ethernet journey line characteristic. In one case, for instance, the system mirrors data from the local server 200 through the local mirroring unit 204, which operates as a TCP client over the journey line 206; the remote mirroring unit 208, 308, 408, 508, 608, or 708 operates as a TCP server. More generally, a journey line characteristic indicates that the high-bandwidth low-latency requirements imposed by SCSI, original Off-SiteServer serial connections, SAN connections, and the like are not present in a connection 206 between a local mirroring unit 204 and a remote mirroring unit.

The system might also be characterized by a multiplicity characteristic. That is, the system may provide many-to-one mirroring from two or more local (primary) servers 200 to a single remote mirroring unit 208, 308, 408, 508, 608, or 708. The data mirroring system of remote mirroring unit nonvolatile storage may then include one disk partition for each primary network server 200 with each disk partition holding mirrored data for the respective server 200, one external hard disk 614 for each server 200, one RAID unit 312 for each server 200, or some combination thereof. The various primary (local) servers 200 may all use the same operating systems or they may use some combination of different operating systems. In some cases the destination nonvolatile storage is sufficiently large to hold the combined current nonvolatile data of all of the primary servers 200. As another multiplicity characteristic, the system may provide one-to-many mirroring from a given local (primary) server 200 to two or more remote mirroring units 208, 308, 408, 508, 608, or 708.

The invention also provides methods, including methods for installing flexible mirroring units, methods for using such units, and methods for doing both. For example, a method for facilitating flexible data mirroring includes at least two steps from the group 1300 of installing steps. Another method for flexible data mirroring includes one or more transmitting steps 1302.

One of the installing steps involves connecting 1304 the local server 200 to the local mirroring unit 204 with the standard storage subsystem bus 202, thereby permitting the local mirroring unit 204 to emulate a disk subsystem in communications over the link 202. A step 1306 involves connecting the local mirroring unit 204 to the journey link 206 for trans-mission of data by at least one of an Ethernet connection and a TCP connection. A step 1308 involves connecting the remote mirroring unit 208, 308, 408, 508, 608, or 708 to the journey link 206 for reception of data transmitted by at least one of an Ethernet connection and a TCP connection. A testing step 1310 tests at least one mirroring unit 204, 208, 308, 408, 508, 608, or 708 after at least partial completion of at least one of the aforesaid connecting steps.

One of the transmitting steps 1302 is a step 1312 which transmits data from the local server 200 to the local mirroring unit 204 over the standard storage subsystem bus 202 while the local mirroring unit 204 emulates a disk subsystem. A step 1314 transmits data from the local mirroring unit 204 over the journey link 206 to the remote mirroring unit 208, 308, 408, 508, 608, or 708. A step 1316 (which may be performed with the same data transmission as step 1314) transmits data from the local mirroring unit 204 over the journey link 206 to the remote mirroring unit 208, 308, 408, 508, 608, or 708 when the remote mirroring unit is serverless, that is, when it is not attached to a secondary server 300.

Particular embodiments (methods, configured storage media, and systems) of the present invention are expressly illustrated and described herein. To avoid unnecessary repetition, concepts and details applicable to one embodiment are not always stated expressly with regard to other embodiments. Unless otherwise expressly indicted, however, the descriptions herein of particular embodiments of the present invention extend to other embodiments. For instance, discussions of the invention's systems also pertain to its methods and vice versa, and the descriptions of inventive methods also pertain to corresponding configured storage media and vice versa.

As used herein, terms such as "a" and "the" and item designations such as "mirroring unit" are generally inclusive of one or more of the indicated item. In particular, in the claims a reference to an item means at least one such item is required, unless otherwise indicated.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A system for storing data, comprising:
an interface configured to receive multiple data changes, the multiple data changes being created in a particular order, wherein at least one of the data changes:
indicates corresponding data to be stored on a storage volume of a host; and
indicates at least one block of the storage volume on where the corresponding data is to be stored;
a meta-data generator configured to, for each of the multiple data changes:
generate meta-data indicating the data change's position in the order; and
associate the qenerated meta-data with the data change;

a local buffer configured to store one or more of the multiple data changes and the meta-data associated with the one or more of the multiple data changes;
a local mirror divided into a plurality of units;
a comparator configured to, for the one or more of the multiple data changes:
   determine that mirror data in a unit of the local mirror that corresponds to the data change is different from the data indicated by the data change, and
   in response to the determining, store the data change in the local buffer with the meta-data associated with the data change; and
a communications link coupled to the local buffer wherein the communications link is configured to send to a remote buffer: (A) the one or more of the multiple data changes and (B) the meta-data associated with the one or more of the multiple data changes,
wherein the remote buffer is configured to receive and store the sent data changes and the meta-data associated with the sent data changes.

2. The system of claim 1, wherein the meta-data includes a timestamp and a sequence number.

3. The system of claim 1, further comprising:
a communications link monitor configured to monitor a status of the communications link;
wherein the local buffer is configured to pause transmission of the data changes and associated meta-data if the communications link monitor detects an interruption of the communications link.

4. The system of claim 3, wherein the local buffer is further configured to resume transmission of the data changes and associated meta-data if the communications link monitor detects that the communications link is restored.

5. The system of claim 1, further comprising:
a communications link monitor configured to monitor a status of the communications link;
wherein the local buffer is configured to adjust a rate of transmission of the data changes and associated meta-data in response to the communications link monitor detecting a change in available bandwidth.

6. The system of claim 1, wherein the remote buffer is coupled to a remote mirror including all of the data stored on the storage volume at an associated point in time; and
wherein the remote buffer is configured to update the remote mirror using the data changes.

7. The system of claim 6, wherein the remote buffer is configured to store in the remote mirror an oldest data change of the data changes stored in the remote buffer according to the associated meta-data and remove the oldest data change from the remote buffer.

8. The system of claim 6, further comprising:
a volume reconstructor configured to generate data of the storage volume from a previous point in time from the remote mirror, and at least one of the data changes and the meta-data associated with the at least one data change.

9. The system of claim 6 wherein the remote buffer is configured to, upon receiving a particular one of the data changes and associated meta-data, send an ACK signal to the local buffer,
and wherein the local buffer is configured to, upon receiving the ACK signal, send an ACK-ACK signal to the remote buffer,
and wherein the remote buffer is configured to update the remote mirror using the particular data change only upon receiving the ACK-ACK signal.

10. The system of claim 9 wherein the remote buffer is configured to compute a first signature for the content of the particular data change stored by the remote buffer,
and wherein the remote buffer is configured to include the first signature with the ACK signal it sends to the local buffer,
and wherein the local buffer is configured to compute a second signature for the content of the particular data change stored by the local buffer,
and wherein the local buffer is configured to send an ACK-ACK signal to the remote buffer only if the second signature computed by the local buffer matches the first signature computed by the remote buffer.

11. The system of claim 1,
wherein the local buffer is configured to maintain a particular data change in the local buffer until after an acknowledgement indicating that the particular data change was stored in the remote buffer is received by the local buffer.

12. The system of claim 11, wherein the local mirror is configured to store the data changes and wherein the local mirror includes all of the data stored on the storage volume at a particular point in time; and
wherein the interface is further configured to transmit the data changes to the local buffer and the local mirror.

13. The system of claim 1, wherein the remote buffer is coupled to a remote mirror including all of the data stored on the storage volume at a point in time; and
wherein the local buffer is configured to maintain a particular data change in the local buffer until after an acknowledgement indicating that the particular data change was stored in the remote mirror is received by the local buffer.

14. The system of claim 13, wherein the local buffer is configured to remove the particular data change from the local buffer when the acknowledgement indicating that the particular data change was stored in the remote mirror is received by the local buffer.

15. The system of claim 13, wherein the local buffer is configured to remove the particular data change from the local buffer when a signature associated with the particular data change and received by the local buffer is validated.

16. The system of claim 1, wherein the remote buffer is coupled to a remote mirror including all of the data stored on the storage volume at a particular point in time; and
wherein the remote buffer is configured to store the data changes in the remote mirror corresponding to the order.

17. The system of claim 1, further comprising:
a plurality of hosts, each host including a primary storage volume;
a plurality of first mirroring units, each mirroring unit coupled to an associated host and configured to mirror the primary storage volume of the associated host, such that each host is coupled its own first mirroring unit; and
a second mirroring unit coupled to the first mirroring units, the second mirroring unit configured to mirror the mirrored primary storage volumes of the first mirroring units;
wherein:
   a first mirroring unit of the plurality of first mirroring units includes the interface, the meta-data generator, and the local buffer, where the first mirroring unit is coupled to its corresponding host through the interface.

18. The system of claim 17, wherein the second mirroring unit locks access to a mirror of a mirrored primary storage volume in response to an access by an associated first mirroring unit.

19. The system of claim 1, wherein the remote buffer is coupled to a remote mirror divided into a plurality of sections, the sections of the remote mirror corresponding to the blocks of the storage volume on a one-to-one basis; and
wherein the remote buffer is configured to store the data changes in the corresponding sections of the remote mirror.

20. The system of claim 1, wherein:
the interface is a standard storage subsystem bus interface; and
the data changes are write requests received through the standard storage subsystem bus interface.

21. The system of claim 20 wherein the local mirror is coupled to the interface through a second standard storage subsystem bus interface; and
wherein the interface is configured to provide a first copy of the write requests to the local mirror through the second standard storage subsystem bus interface and to provide a second copy of the write requests to the local buffer.

22. The system of claim 1 wherein the remote buffer stores the data changes and associated meta-data in a nonvolatile storage device.

23. A system for storing data, comprising:
a remote buffer comprising a memory that stores remote buffer elements, the remote buffer coupled to a communications link and configured to receive via the communications link and store a plurality of data changes created in a particular order, wherein one or more the data changes:
indicates corresponding data to be stored on a storage volume of a host,
indicates at least one block of the storage volume on which the corresponding data is to be stored, and
is associated with meta-data indicating the data change's position in the particular order; and
a remote mirror;
wherein:
the remote buffer is configured to, upon receiving a particular one of the data changes and associated meta-data, send an ACK signal to a local buffer from which the remote buffer receives the data changes, and
the remote buffer is configured to update the remote mirror using the particular data change only upon receiving an ACK-ACK signal from the local buffer subsequent to sending the ACK signal.

24. The system of claim 23, wherein the remote mirror includes all of the data stored on the storage volume at an associated point in time,
wherein the remote buffer is configured to update the remote mirror using the data changes.

25. The system of claim 23 wherein the remote buffer stores the data changes and associated meta-data in a nonvolatile storage device.

26. The system of claim 23 wherein the remote buffer is configured to compute a signature for the content of the particular data change stored by the remote buffer,
and wherein the remote buffer is configured to include the signature with the ACK signal it sends to the local buffer.

27. A computer-readable storage device having contents configured to cause a computing system to perform operations for storing data, the operations comprising:
receiving a plurality of data changes created in a particular order, wherein at least one of the data changes:
indicates corresponding data to be stored on a storage volume of a host, and
indicates at least one block of the storage volume on which the corresponding data is to be stored;
associating with one or more of the data changes, meta-data indicating the data change's position in the particular order; and
for the one or more data changes:
determining that data in the block indicated by the data change is different from the data indicated by the data change, and
in response to the determining, storing the data change in a local buffer with the meta-data associated with the data change.

28. The computer-readable storage device of claim 27, the operations further comprising:
updating a remote mirror using the received and stored data changes.

29. The computer-readable storage device of claim 27 where storing the received data change with the associated meta-data comprises storing the data change in a nonvolatile storage device.

30. The computer-readable storage device of claim 29, the operations further comprising:
upon receiving a specific one of the data changes and associated meta-data, sending an ACK signal to the local buffer from which the data changes and meta-data are received,
and wherein the remote mirror is updated using the specific data change only upon receiving an ACK-ACK signal from the local buffer subsequent to sending the ACK signal.

31. The computer-readable storage device of claim 30, the operations further comprising:
computing a signature for the content of the stored specific data change,
and wherein the ACK signal sent to the local buffer includes the signature.

32. A system for conveying data, comprising:
a memory;
a processor;
an interface coupled to the memory, the interface and memory configured to receive and store a plurality of data changes created in a particular order, wherein at least one of the changes:
indicates corresponding data to be stored on a storage volume of a host, and
indicates at least one block of the storage volume on which the indicated data is to be stored;
a meta-data generator configured to:
generate meta-data indicating the data change's position in the order; and
associate the generated meta-data with the data change;
a local buffer configured to (1) store one or more of the data changes and the meta-data associated with the one or more of the multiple data changes, (2) transmit, to a remote buffer via a communications link coupled to the local buffer, the data changes and the meta-data associated with the one or more of the multiple data changes stored in the local buffer, and (3) upon receiving an ACK signal signifying the remote buffer's receipt of a particular one of the data changes and associated meta-data block, send an ACK-ACK signal to the remote buffer.

33. The system of claim 32 wherein the received ACK signal includes a first signature computed by the remote buffer for the content of the particular data change stored by the remote buffer, and wherein the local buffer is configured to compute a second signature for the content of the particular data change stored by the local buffer, and wherein the local buffer is configured to send an ACK-ACK signal to the remote buffer only if the second signature computed by the local buffer matches the first signature computed by the remote buffer.

34. A method in a computing system for conveying data, comprising:

receiving, from a processor, a plurality of data changes in a particular order, wherein one or more of the data changes:

indicates corresponding data to be stored on a storage volume of a host, and;

indicates at least one block of the storage volume on which the indicated data is to be stored;

associating with at least one of the data changes, based on the order, generated meta-data indicating the data change's position in the order;

storing, in a local buffer, at least one of the received data changes and meta-data associated with the at least one of the multiple data changes;

transmitting the stored data changes and the meta-data the meta-data associated with the stored data changes to a remote buffer via a communications link; and upon receiving an ACK signal signifying the remote buffer's receipt of a particular one of the data changes and associated meta-data, sending an ACK-ACK signal to the remote buffer.

35. The method of claim 34 wherein the received ACK signal includes a first signature computed by the remote buffer for the content of the particular data change stored by the remote buffer, the method further comprising:

computing a second signature for the content of the particular data change stored by the local buffer; and sending an ACK-ACK signal to the remote buffer only if the second signature computed by the local buffer matches the first signature computed by the remote buffer.

* * * * *